United States Patent
Ido

(10) Patent No.: US 8,547,599 B2
(45) Date of Patent: Oct. 1, 2013

(54) COLOR IMAGE FORMING APPARATUS AND COLOR IMAGE CORRECTING METHOD

(75) Inventor: Yoko Ido, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 958 days.

(21) Appl. No.: 12/186,334

(22) Filed: Aug. 5, 2008

(65) Prior Publication Data

US 2009/0059323 A1    Mar. 5, 2009

(30) Foreign Application Priority Data

Aug. 27, 2007    (JP) ................. 2007-220351

(51) Int. Cl.
 *H04N 1/407*    (2006.01)
 *G06K 9/52*    (2006.01)
 *G06K 9/40*    (2006.01)

(52) U.S. Cl.
 USPC ......... 358/3.27; 358/1.9; 358/3.06; 358/3.24; 358/3.26; 358/532; 358/533; 382/209; 382/254; 382/266; 382/267; 382/269

(58) Field of Classification Search
 USPC .............. 358/1.1, 1.9, 1.12, 1.16, 1.17, 1.18, 358/3.03–3.24, 3.26–3.27, 533–536; 382/254–269
 See application file for complete search history.

(56) References Cited

U.S. PATENT DOCUMENTS

| | | | | |
|---|---|---|---|---|
| 5,034,990 A | * | 7/1991 | Klees | 382/252 |
| 5,715,070 A | * | 2/1998 | Tone et al. | 358/468 |
| 5,721,793 A | * | 2/1998 | Ushida et al. | 382/300 |
| 6,665,094 B1 | * | 12/2003 | Lapstun | 358/1.9 |
| 6,977,757 B1 | * | 12/2005 | Takahashi et al. | 358/3.05 |
| 7,142,330 B2 | * | 11/2006 | Takahashi et al. | 358/3.05 |
| 7,339,599 B2 | | 3/2008 | Hayashi | |
| 7,344,217 B2 | | 3/2008 | Kitamura et al. | |
| 7,598,971 B2 | * | 10/2009 | Tezuka et al. | 347/116 |
| 2005/0179940 A1 | * | 8/2005 | Konji et al. | 358/1.15 |

(Continued)

FOREIGN PATENT DOCUMENTS

| | | |
|---|---|---|
| JP | 10-341330 A | 12/1998 |
| JP | 2000-253232 A | 9/2000 |

(Continued)

OTHER PUBLICATIONS

U.S. Appl. No. 12/179,165.

(Continued)

*Primary Examiner* — Richard Zhu

(74) *Attorney, Agent, or Firm* — Cowan, Liebowitz & Latman, P.C.

(57) ABSTRACT

According to the present invention, there is provided a color image forming apparatus which includes image forming units forming images, each for each color component, and superimposes the images of the color components on one another to form a color image. The image forming apparatus includes a scan line changing unit shifting the position of each pixel in a sub scanning direction for each color component of halftone image data to be processed so as to cancel a shift amount of a scan line on an image carrier in each of the image forming units in the sub scanning direction; an interpolation inhibited area determining unit determining an interpolation inhibited area in the image data; and an interpolation unit applying an interpolation process for smoothing a pixel-level shift caused by shifting of image data by the scan line changing unit to the image data excluding the interpolation inhibited area.

12 Claims, 19 Drawing Sheets

(56) References Cited

U.S. PATENT DOCUMENTS

| | | | |
|---|---|---|---|
| 2006/0098232 A1* | 5/2006 | Nakano et al. | 358/3.26 |
| 2006/0119895 A1* | 6/2006 | Takata et al. | 358/3.26 |
| 2006/0226338 A1* | 10/2006 | Tojima et al. | 250/208.1 |
| 2006/0232620 A1* | 10/2006 | Kitamura et al. | 347/15 |
| 2008/0123145 A1 | 5/2008 | Kitamura et al. | |

FOREIGN PATENT DOCUMENTS

| | | |
|---|---|---|
| JP | 2002-116394 | 4/2002 |
| JP | 2003-241131 | 8/2003 |
| JP | 2004-170755 | 6/2004 |
| JP | 2004-223854 | 8/2004 |
| JP | 2006-297633 | 11/2006 |

OTHER PUBLICATIONS

U.S. Appl. No. 12/179,122.
U.S. Appl. No. 12/179,133.
U.S. Appl. No. 12/179,140.
The above references were cited in a Dec. 16, 2011 Japanese Office Action, without an English Translation, that issued in Japanese Patent Application No. 2007-220351.

* cited by examiner

INCLINATION SHIFT AMOUNT

BITMAP IMAGE
(BEFORE TONE CORRECTION)

CORRECTED BITMAP IMAGE

BITMAP IMAGE
(AFTER TONE CORRECTION)

EXPOSURE IMAGE

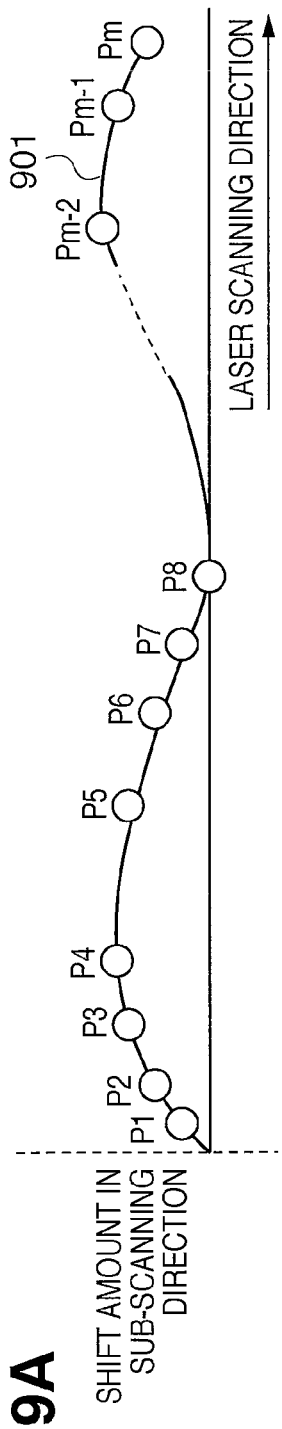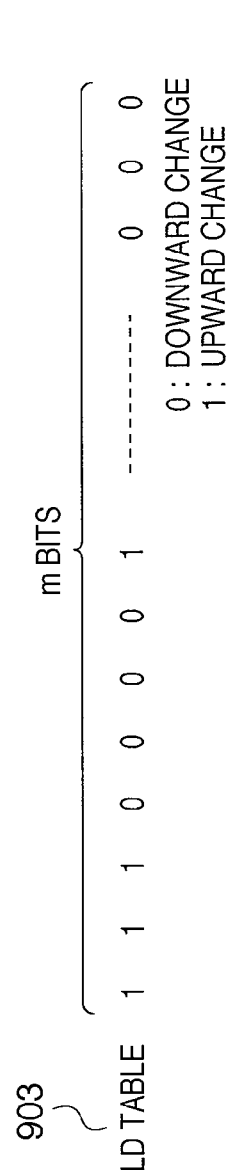

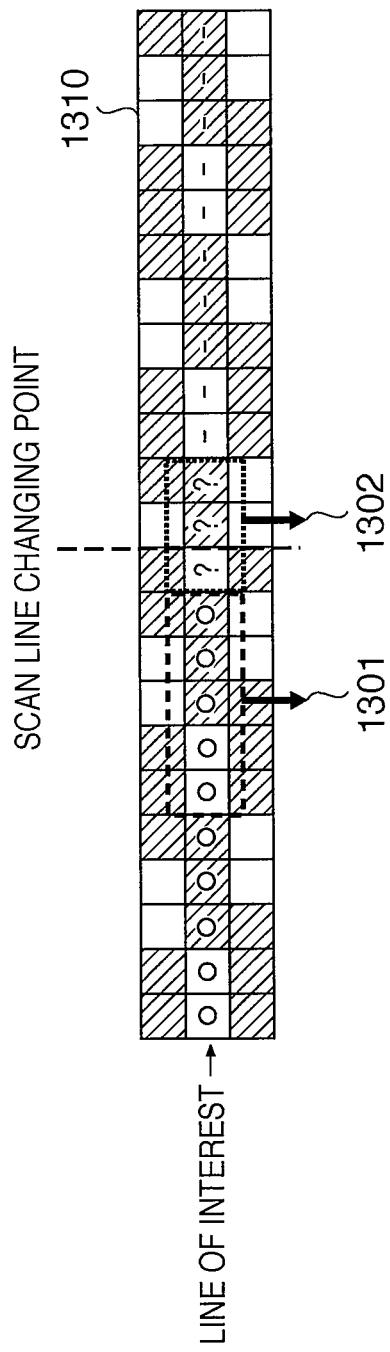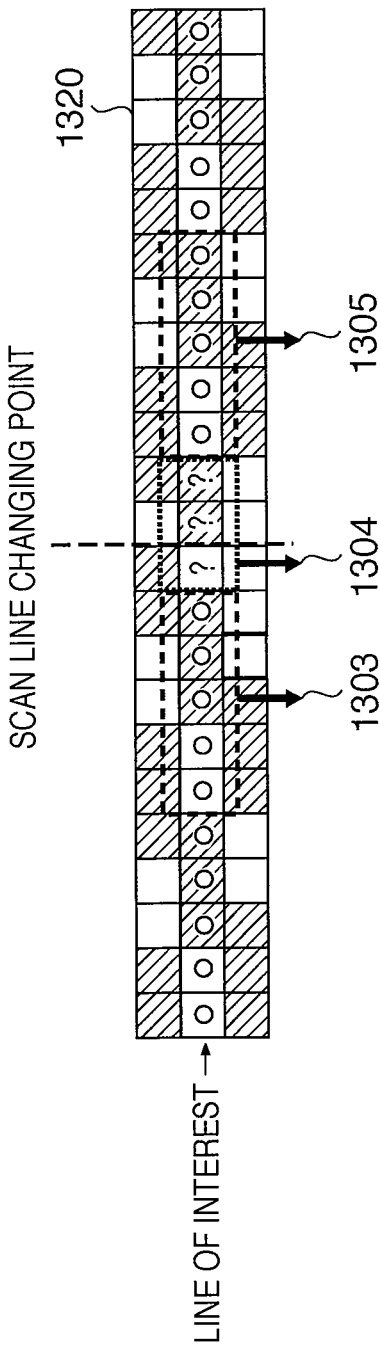

FIG. 14

| input | | | INTERPOLATION DETERMINATION |
|---|---|---|---|
| CONTINUOUS TONE | PATTERN | ISOLATED POINT | |
| OFF | OFF | OFF | OFF |
| OFF | OFF | ON | ON |
| OFF | ON | OFF | ON |
| OFF | ON | ON | ON |
| ON | OFF | ON | OFF |
| ON | ON | OFF | OFF |
| ON | ON | ON | OFF |

1401 / 1402

F I G. 15A
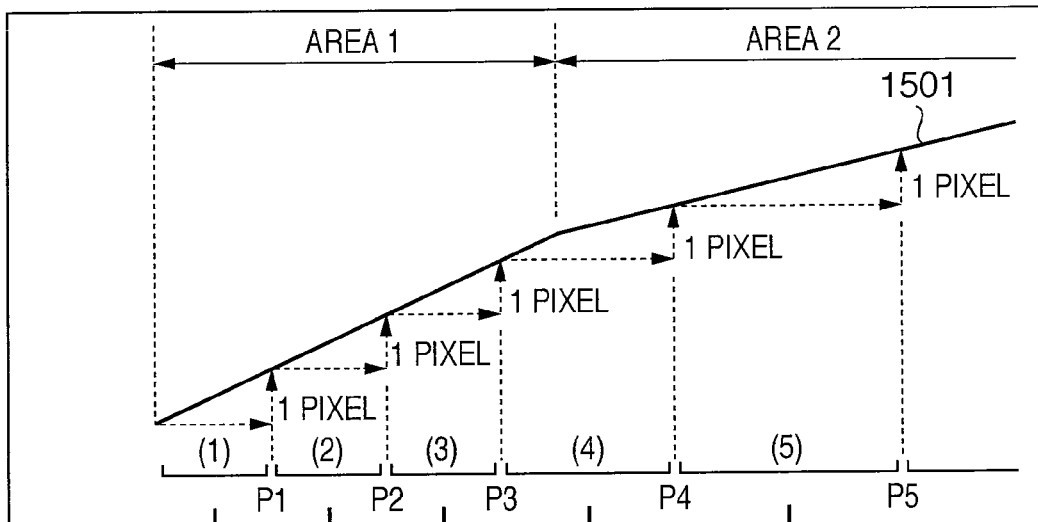
F I G. 15B
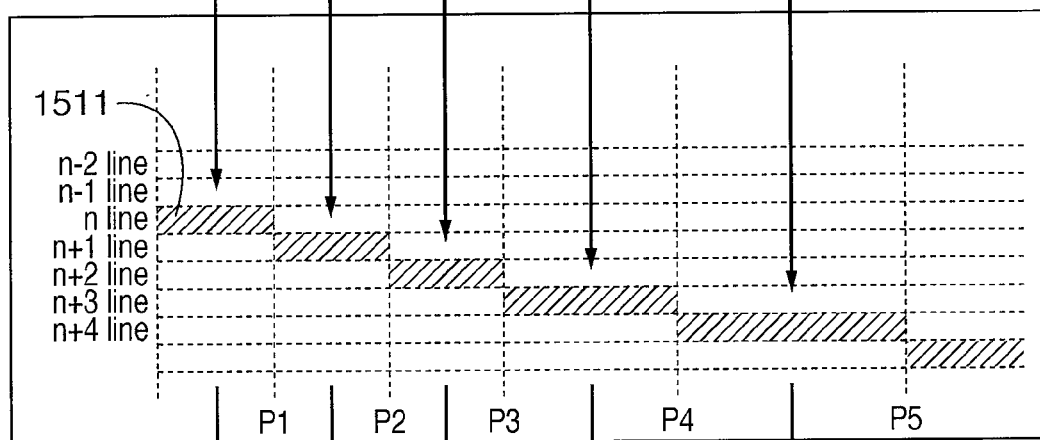
F I G. 15C
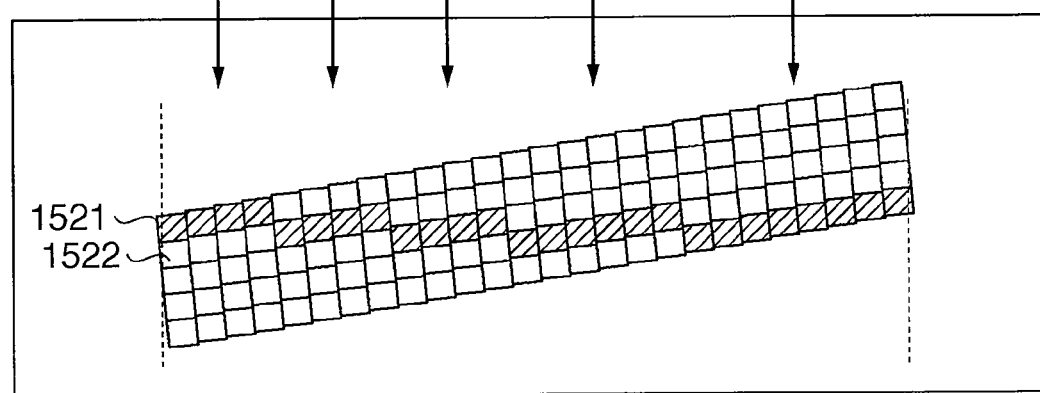

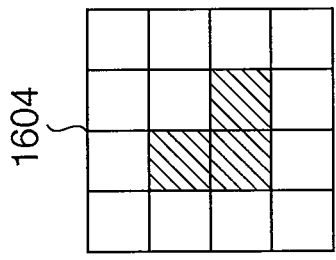
FIG. 16A  1601
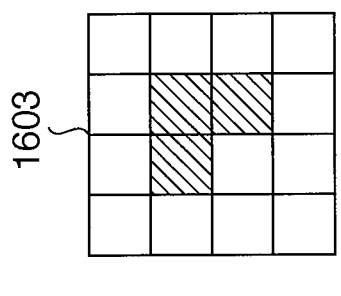
FIG. 16B  1602
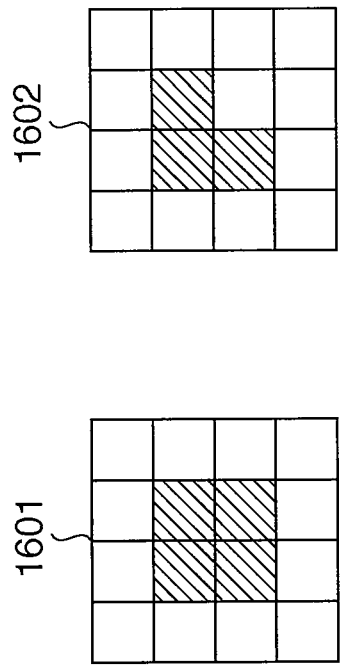
FIG. 16C  1603
FIG. 16D  1604
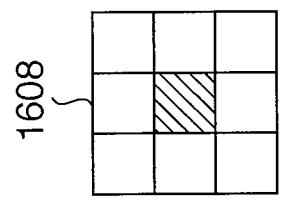
FIG. 16E  1605
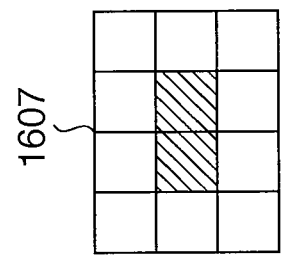
FIG. 16F  1606
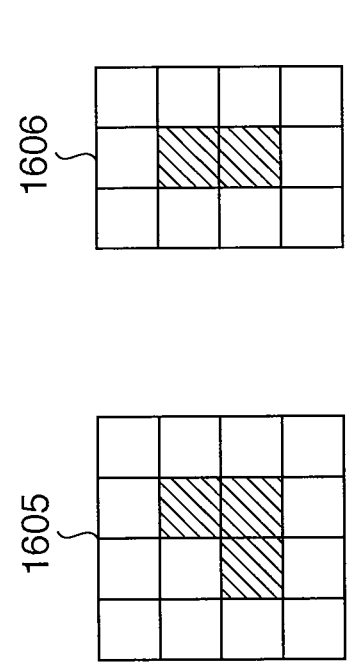
FIG. 16G  1607
FIG. 16H  1608

COLOR IMAGE FORMING APPARATUS AND COLOR IMAGE CORRECTING METHOD

BACKGROUND OF THE INVENTION

1. Field of the Invention

The present invention generally relates to a color image forming apparatus and a color image forming method and, in particular, to a tandem electrophotographic color image forming apparatus including separate image forming units for color components and a color image correcting method.

2. Description of the Related Art

There are tandem color image forming apparatuses such as printers or copying machines that include as many electrophotographic color image forming units as the number of available color components and transfer toner images of the color components one after another onto printing media, using the image forming units. The image forming units for each color include a developing machine and a photosensitive drum. It is known that there are multiple factors that can cause misalignments (called registration errors) of images of the color components in a tandem color image forming apparatus.

The factors include nonuniformity and misalignment of lenses of a deflecting scanning unit including an optical system such as polygon mirrors and fθ lenses and misalignment of attachment of the deflecting scanning unit to the image forming apparatus. These misalignments prevent a scan line from becoming parallel with the axis of rotation of a photosensitive drum and cause an inclination or skew of the scan line. If the degree of inclination and skew of scan lines (hereinafter referred to as the profile or shape of a scanning line) differs among the colors, registration errors occur.

The characteristics of profiles vary among image forming apparatuses, that is, recording engines. In addition, deflecting scanning units for different colors have different profile characteristics. FIGS. 6A to 6D show exemplary profiles. In FIGS. 6A to 6D, the abscissa represents positions in the main scanning direction of an image forming apparatus. The straight line 600 extending in the main scanning direction in FIG. 6A represents the ideal characteristic (profile) of a scan line without a skew. Curves 601 and 602 (FIG. 6B), curve 603 (FIG. 6C), and curve 604 (FIG. 6D) represent the profiles of scan lines of different colors, cyan (hereinafter abbreviated as C), magenta (M), yellow (Y), and black (K), respectively. The ordinate represents the amount of shift in the sub scanning direction with respect to the ideal characteristic. As can be seen from the figures, the curves of the profiles vary from color to color. When electrostatic latent images are formed on photosensitive drums of the image forming units for the individual colors, the differences in profile appear as registration errors of image data of the colors.

A method for handling registration errors is described in Japanese Patent Laid-Open No. 2002-116394. In the method, the magnitude of a skew of a scan line is measured with an optical sensor in the fabrication process of a deflecting scanning device, the skew of the scan line is adjusted by mechanically rotating a lens, and then the lens is fixed with an adhesive.

Japanese Patent Laid-Open No. 2003-241131 describes a method in which, in a process for attaching a deflecting scanning device to a color image forming apparatus, an inclination of a scan line is measured with an optical sensor and the deflecting scanning device is tilted to adjust the inclination of the scan line before the deflecting scanning device is attached to the color image forming apparatus.

Japanese Patent Laid-Open No. 2004-170755 describes a method in which the magnitudes of an inclination and skew of a scan line are measured with an optical sensor, bitmap image data is corrected to cancel the inclination and skew, and the corrected image is formed. In particular, a misalignment of an actual scan line with respect to a straight line on the surface of a photosensitive drum that is parallel to the axis of rotation of the photosensitive drum, that is, an ideal scan line, is canceled by shifting image data in the opposite direction by the amount of the misalignment. The method does not require a mechanical adjustment member and an adjustment process because the method corrects image data. Accordingly, the method can reduce the size of the color image forming apparatus and can handle registration errors less expensively than the methods described in Japanese Patent Laid-Open No. 2002-116394 and No. 2003-241131. The electrical correction of registration errors is divided into pixel-wise correction and sub-pixel-level correction. In pixel-wise correction, pixels are shifted (offset) pixel by pixel in the sub scanning direction in accordance with the amounts of an inclination and skew to be corrected as shown in FIGS. 15A to 15C. In the following description, the position at which an offset is made is referred to as a scan line changing point and the process for offsetting is referred to as a scan line changing process. Points P1 to P5 in FIG. 15A are scan line changing points.

In FIG. 15A, the profile 1501 of the scan line is to be corrected. While the profile 1501 may be represented by a sequence of coordinate values of pixels on the scan line, for example, the profile 1501 is represented by an approximating curve divided according to areas in FIG. 15A. A scan line changing point is a position in the main scanning direction at which a misalignment of one pixel occurs with respect to the sub scanning direction when the profile is scanned in the main scanning direction. In FIG. 15A, points P1 to P5 are such points. The dots subsequent to a scan line changing point are shifted by one line in the direction opposite to the sub scanning direction in the profile. This operation is performed for each line. FIG. 15B shows an example of image data resulting from shifting at each scan line changing point in the sub scanning direction. The shaded portions 1511 in FIG. 15B represent one line before the scan line changing process, that is, one line in original image data. As a result of the scan line changing process, each line is shifted in the direction in which the misalignment of the profile with respect to the sub scanning direction is cancelled. FIG. 15C shows an example of image data obtained as a result of the shifting. The shaded portions represent one line before the correction. During formation of an image, corrected image data is formed line by line. For example, normal image formation is performed in the sequence of lines 1521, 1522, . . . , and so on. As a result, the shaded portions constituting one line in the image data before the correction are formed on an ideal scan line on which the line is to be formed. However, sub-pixel misalignments in the sub scanning direction remain because the scan line changing process is performed on a pixel-by-pixel basis.

Therefore, sub-pixel misalignments that cannot be corrected by the scan line changing process are corrected by adjusting the tone values of bitmap image data using pixels around scan line changing points in the sub scanning direction. That is, when the profile characteristic indicates an upward inclination with respect to the scanning direction, bitmap image data before tone correction is corrected so that a pixel sequence is inclined in the direction (downward in this example) opposite to the inclination indicated by the profile. In order to approximate the image data to ideal corrected image data, tone correction is applied to pixels near the scan line changing points to smooth the steps at the scan line changing points. The smoothing can be accomplished by using the pulse width or intensity of laser, for example. The tone correction applied for smoothing after the scan line changing process is hereinafter called interpolation process.

Depending on the nature of an image, the interpolation process of image data may improve or impair the image quality of the image. For example, the visibility of information of an image such as an image containing a pattern of a repetitive geometric figure (hereinafter referred to as a pattern image), characters, or fine lines that can be drawn using office document processing software can be improved by the interpolation process for smoothing. In contrast, the quality of a continuous tone image produced by a screening process may be degraded when the interpolation process is applied to pixels near scan line changing points, because the interpolation process can cause inconsistencies in density at the portions near the scan line changing points. For example, when a line growth screen is used, the interpolation process changes the thickness of lines constituting the screen at the scan line changing points, giving an appearance of varying densities from a macroscopic viewpoint. Further, when the interpolation process is applied to an ad-on image such as a background pattern consisting of background areas and hidden image areas described in Japanese Patent Laid-Open No. 2004-223854, the effect of the ad-on image can be impaired, therefore the interpolation process is not appropriate for such images.

In this way, when the interpolation process is uniformly applied to an entire image without taking into consideration the characteristics of image data, the quality of the image can be degraded. Therefore, determination must be made as to whether the interpolation process should be applied to image data of interest, on the basis of attributes or features of the image data. An invention has been proposed that detects features of an image before halftoning or pixel-wise correction is applied to the image, and then halftoning or an exceptional process are applied to the image according to the result of the detection (see Japanese Patent Laid-Open No. 2006-297633). The exceptional processing includes sub-pixel interpolation.

However, the invention disclosed in Japanese Patent Laid-Open No. 2006-297633 is intended to process image data before halftoning or pixel-wise correction. That is, features of input continuous tone image data are detected and then halftoning or an exceptional process is applied to the image data according to the result of the detection.

On the other hand, quantization of image data is essential to reduce consumption of limited processing resources and speed up processing because quantization compresses the amount of data and reduces the load of data processing. Even if input data is continuous tone image data, it is desirable to first quantize the image data to reduce the amount of data and to reduce the load of the subsequent processing.

However, in the related art documents given above, no mention is made of a method of detecting features of halftoned (quantized) image data before the subsequent processing. Therefore, the image quality of a printout of received facsimile image data and image data converted into binary data by an application program can be degraded.

Furthermore, the related-art techniques perform a scan line changing process to correct misalignments of a scan line and then smooth the line by the interpolation process. However, image data after the scan line changing process has lost the continuity of one line and therefore the related-art techniques cannot detect features from the image data itself.

SUMMARY OF THE INVENTION

The present invention has been made in light of the related art described above and an object of the present invention is to solve the problems described above. In particular, an object of the present invention is to provide a color image forming apparatus and a color image correcting method capable of appropriately performing an interpolation process on image data whose attribute information has been lost or to which halftoning or pixel-wise correction has been applied or the continuity of which has been lost as a result of a scan line changing process.

To achieve the object, the present invention provides a color image forming apparatus including image forming units which form images, each for each color component, and superimposing the images of the color components on one another to form a color image, includes: a scan line changing unit shifting the position of each pixel in a sub scanning direction for each color component of halftone image data to be processed so as to cancel a shift amount of a scan line on an image carrier in each of the image forming units in the sub scanning direction; an interpolation inhibited area determining unit determining an interpolation inhibited area in the image data; and an interpolation unit applying an interpolation process for smoothing a pixel-level shift caused by shifting of halftone image data by the scan line changing unit to the halftone image data excluding the interpolation inhibited area.

The present invention has the effect of enabling interpolation to be properly performed on image data whose attribute information has been lost, or to which halftoning or pixel-wise correction has been applied, or whose continuity has been lost as a result of a scan line changing process.

Further features of the present invention will become apparent from the following description of exemplary embodiments with reference to the attached drawings.

BRIEF DESCRIPTION OF THE DRAWINGS

FIGS. 9A to 9D show the pixel locations of scan line changing points in the main scanning direction and the directions of changes between scan line changing points;

FIGS. 13A and 13B illustrate a process for correcting a scan line changing point;

FIG. 14 shows an exemplary decoder LUT;

FIGS. 15A to 15C illustrate a pixel-wise correction method;

FIGS. 16A to 16H show exemplary isolated pattern templates;

DESCRIPTION OF THE EMBODIMENTS

Figure 1A:
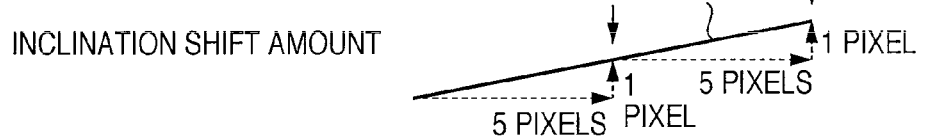
FIGS. 1A to 1F illustrate a sub-pixel-level correction method.
Figure 1B:
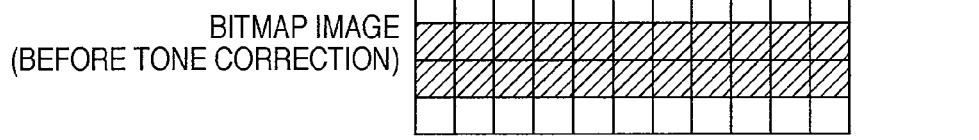
Figure 1C:
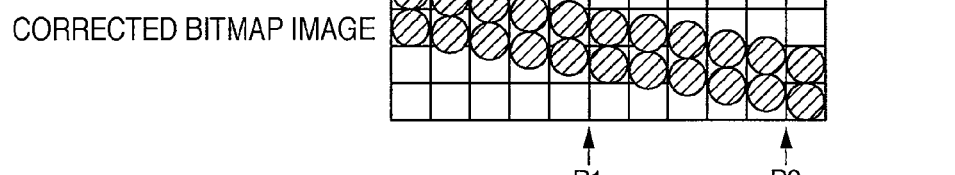
Figure 1D:
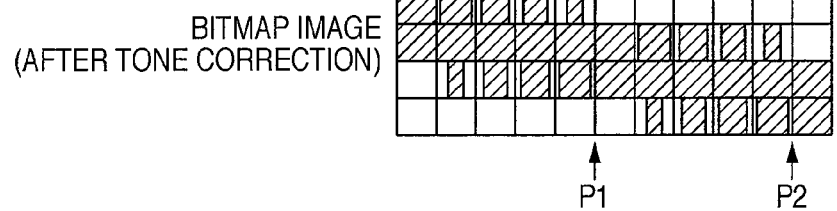
Figure 1E:
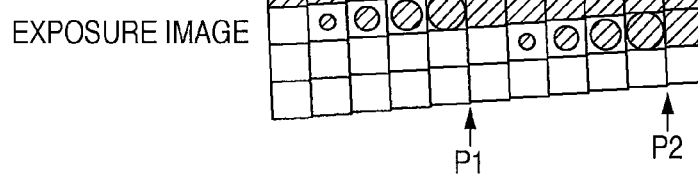
Figure 1F:
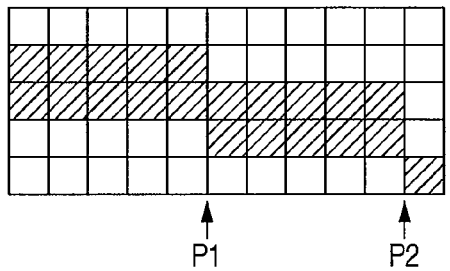

Exemplary embodiments of the present invention will be described with reference to the accompanying drawings. In the exemplary embodiments, a misalignment of an actual scan line with respect to an ideal scan line that should be formed by scanning the surface of a photosensitive drum by a laser beam, that is, a scan line parallel to the axis of rotation of the photosensitive drum, is canceled by shifting halftone image data by the amount of the misalignment in the opposite direction. If types of image of different component colors are the same type (also called attribute), smoothing of the shift of a scan line is applied to all or none of the images of the respective component colors.

That is, a scan line changing process is performed for each color component in halftone image data to be processed in which the positions of pixels are shifted in the sub scanning direction to cancel the amount of a shift of a scan line on an image carrier in an image forming unit with respect to the sub scanning direction. Then, the type of the image of each color component of the image data to be processed is determined. In particular, determination is made as to whether the image is a continuous tone image and whether the image is a pattern image. A pattern image is an image containing a repeated pattern as described with respect to the related art. Then, determination is made on the basis of the determined type of the image of each color component as to whether the interpolation process for smoothing pixel-level shifts caused by the scan line changing process is to be performed. The determination is made for each type of image. However, if an image of a first color component is judged to be a pattern image and also a continuous tone image and the results of determination as to whether to perform the interpolation process of the image of the other color components differ from the result of determination for the first color component, the result of determination for the first color component as to whether to perform the interpolation process is changed. In this way, if the images of the color components are of the same type but the results of determination as to whether to perform the interpolation process differ among the color components, the result of the determination for the color component is changed so that results of the determination become the same for all color components.

The following is a description of an exemplary configuration of a laser beam printer, which is an example of an image forming apparatus to which exemplary embodiments of the present invention can be applied, and an image correction method performed on the laser beam printer. The present exemplary embodiments can also be applied to output apparatuses of other types such as an inkjet printer and MFP (Multi Function Printer/Multi Function Peripheral). The present invention is useful for application to printers that include image forming units, one for each color component, and, for that reason, in which a registration error can occur between the images of the color components. Registration errors can occur in inkjet printers such as serial printers in which recording heads for different color components are mounted on separate carriages and line head printers to which recording heads for different color components can be attached independently of each other. Application of the exemplary embodiments of the present invention to these printers have the effect of improving image quality. However, the profiles of scan lines of tandem color laser printer (LBP) are more likely to vary among the color components. Therefore, the present exemplary embodiments will be described with respect to a tandem color laser printer by way of example.

Image Forming Units of Tandem Color Lbp

Figure 4:
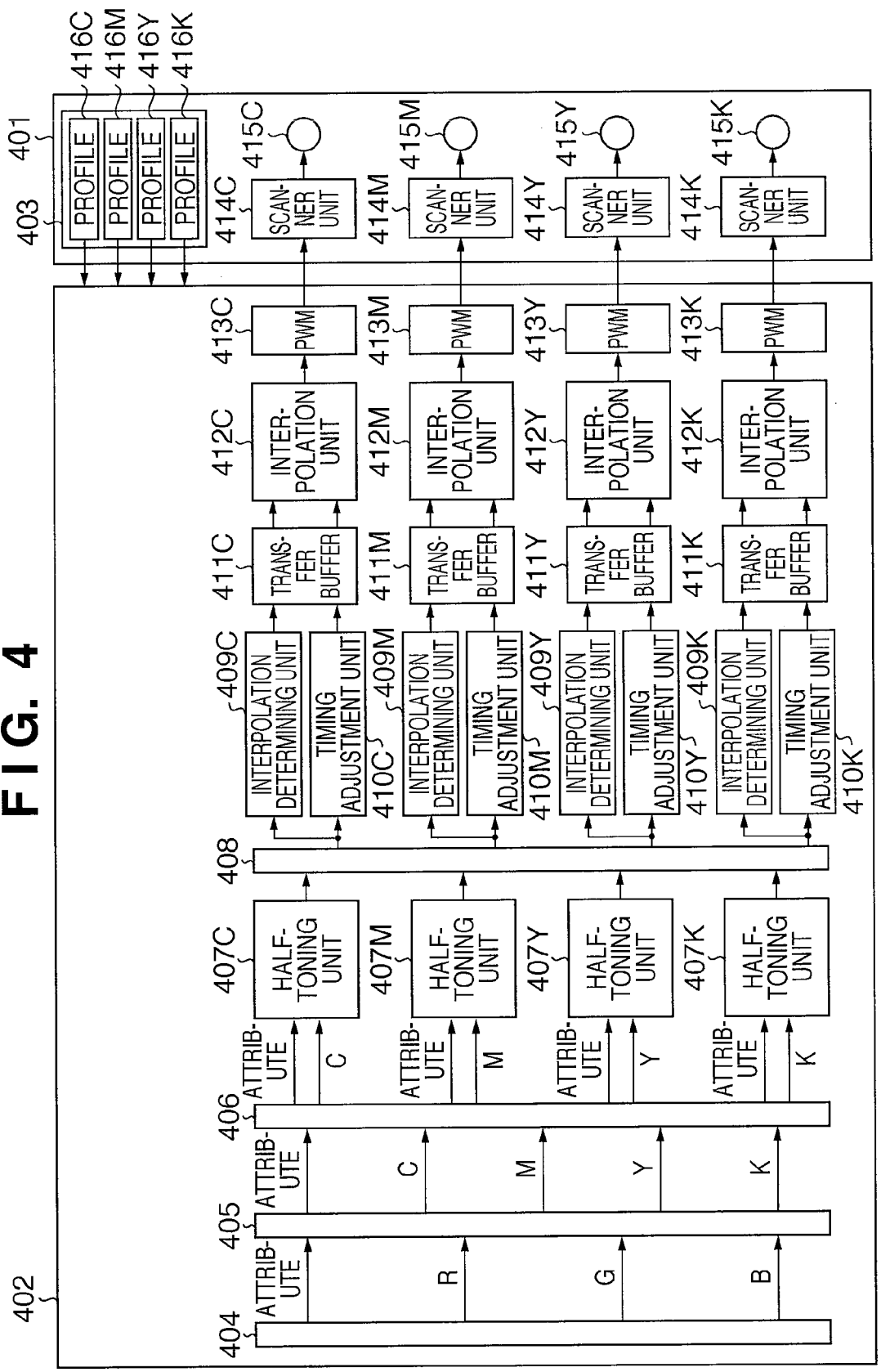
FIG. 4 is a diagram showing blocks relating to generating an electrostatic latent image in an electrophotographic color image forming apparatus according to an exemplary embodiment.

FIG. 4 is a diagram illustrating the blocks of an electrophotographic color image forming apparatus according to a first exemplary embodiment that relate to formation of electrostatic latent images. The color image forming apparatus includes a color image forming unit 401 and an image processing unit 402. The image processing unit 402 generates bitmap image information and the color image forming unit 401 forms an image on a recording medium on the basis of the bitmap image information. The image processing unit 402 also performs corrections such as registration error correction with reference to profile information 416C, 416M, 416Y, 416K for each image forming unit for each color component. The profile information 416C, 416M, 416Y, and 416K has been measured and stored in a profile storage unit 403 beforehand. In the following description, color symbols C, M, Y, and K appended to reference numerals will sometime be omitted to collectively refer to elements of the same sort. The term image forming unit as used herein refers to a unit including a scanner unit 414 and a printing unit 415 for forming a monochromatic image of each color component. The printing unit 415 is a unit including a photosensitive drum and a transfer drum for forming a toner image. The printing unit forms graphics images as well as text, of course.

Figure 2:
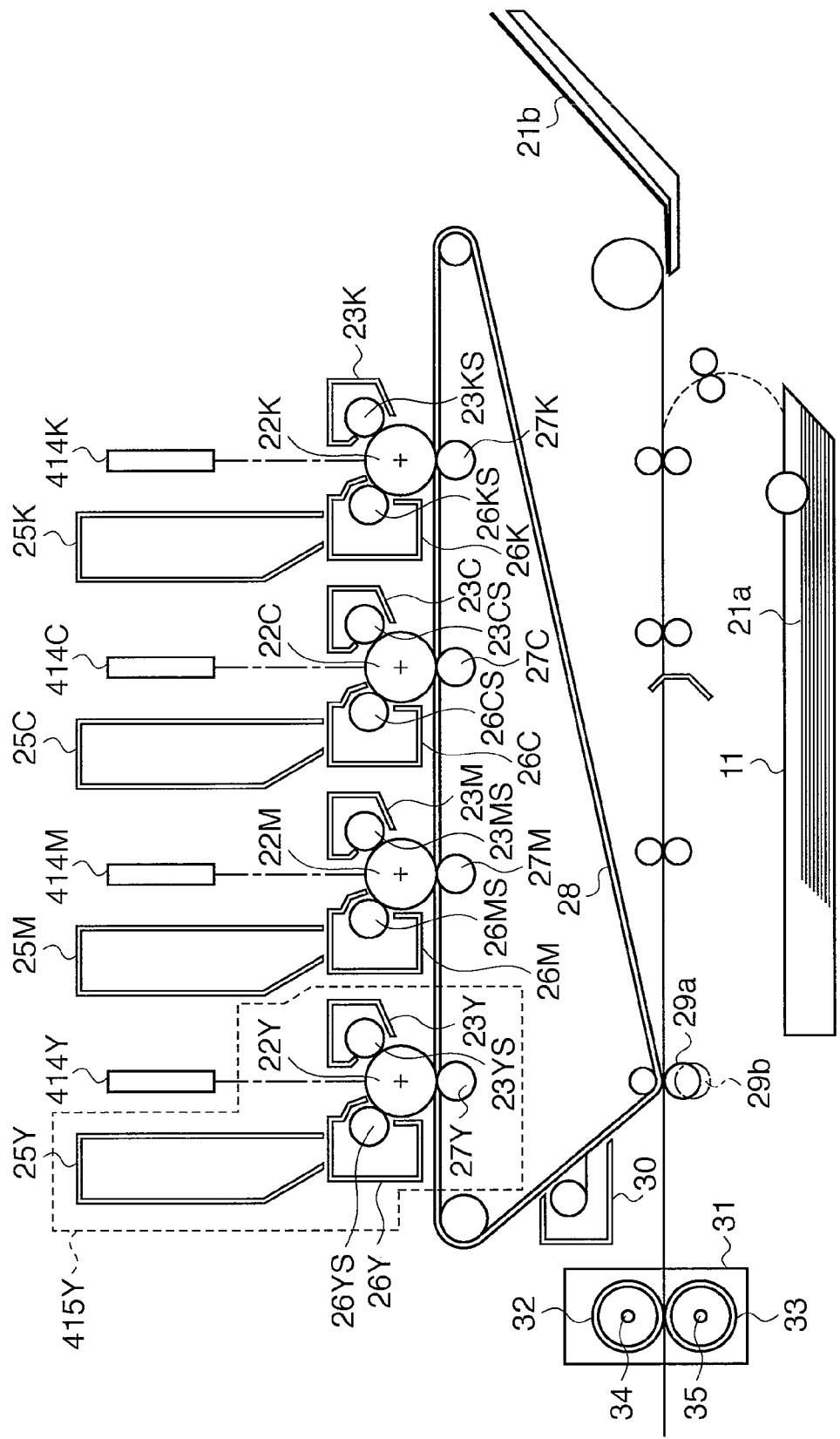
FIG. 2 is a cross-sectional view showing a structure of 4-drum-color-system printer unit.

FIG. 2 is a cross-sectional view of the tandem color image forming unit 401, which is an example of an electrophotographic color image forming apparatus, using an intermediate transfer member 28. Operation of the color image forming unit 401 in the electrophotographic color image forming apparatus will be described with reference to FIG. 2. The color image forming unit 401 drives exposure light in accordance with the amount of exposure time computed by the image processing unit 402 to form an electrostatic latent image on a photosensitive drum, which is an image carrier, and develops the electrostatic latent image to form a monochromatic toner image of each color component. The monochromatic toner images are superimposed on one another to form a multicolor toner image on the intermediate transfer member 28, which is then transferred to a printing medium 11, and the multicolor toner image is fixed on the printing medium 11. The intermediate transfer member 28 is also an image carrier. A charging unit includes four injection chargers 23Y, 23M, 23C, and 23K for electrostatically charging photosensitive drums 22Y, 22M, 22C, and 22K for colors Y, M, C, and K. Each injection charger includes a sleeve 23YS, 23MS, 23CS, 23KS.

The image carrier, namely the photosensitive drum 22Y, 22M, 22C, 22K is rotated counterclockwise by a driving motor in accordance with an image forming operation. The scanner unit 414Y, 414M, 414C, 414K, which is an exposure unit, irradiates the photosensitive drum 22Y, 22M, 22C, 22K with exposure light to selectively expose the surface of the photosensitive drum 22Y, 22M, 22C, 22K to light. As a result, an electrostatic latent image is formed on the surface of the photosensitive drum. A developing device 26Y, 26M, 26C, 26K, which is a developing unit, develops the electrostatic latent image as a toner image of each color Y, M, C, K to visualize the electrostatic latent image. Each developing device includes a sleeve 26YS, 26MS, 26CS, 26KS. The developing device 26 is detachable. The scanner unit is capable of representing the tone of each pixel by varying width or intensity of a laser beam. For example, the scanner unit can provide 16 tone levels.

A primary transfer roller (i.e., any one of primary transfer rollers 27Y, 27M, 27C, 27K), which is a transfer unit, presses the intermediate transfer member 28 turning clockwise onto the photosensitive drum 22Y, 22M, 22C, 22K to transfer a toner image from the photosensitive drum to the intermediate transfer member 28. By applying an appropriate bias voltage to the primary transfer roller and rotating the corresponding photosensitive drum (i.e., one of photosensitive drums 22Y, 22M, 22C, 22K)and the intermediate transfer member 28 at different rotation speeds, the monochromatic toner image is efficiently transferred to the intermediate transfer member 28. This transfer is called primary transfer.

A multicolor toner image produced by combining monochromatic toner images, each formed on each station, (sometimes also referred to as the image forming unit for each color) is carried to a secondary transfer roller 29a as the intermediate transfer member 28 turns. The multicolor toner image on the intermediate transfer member 28 is transferred onto a printing medium 11 carried from a paper feed tray 21 to the secondary transfer roller 29a through rollers. An appropriate bias voltage is applied to the secondary transfer roller 29a to electrostatically transfer the toner image. This transfer is called secondary transfer. The secondary transfer roller 29a abuts on the printing medium 11 at position 29a while transferring the multicolor toner image onto the printing medium 11. After completion of printing, the secondary transfer roller 29a is retracted to position 29b.

A fixing unit 31 includes a fixing roller 32 which heats a printing medium 11 to fuse a multicolor toner image transferred onto the printing medium 11 and a pressure roller 33 for pressing the printing medium 11 onto the fixing roller 32. The fixing roller 32 and pressure roller 33 are hollow tubes and contain heaters 34 and 35, respectively. The fixing unit 31 carries the printing medium 11 bearing the multicolor toner image with the fixing roller 32 and the pressure roller 33 and applies heat and pressure to fix the toner onto the printing medium 11.

The printing medium 11 having toner fixed on it is then ejected to a catch tray, not shown, by ejection rollers, not shown. Then the image forming operation will end. A cleaning unit 30 cleans toner remaining on the intermediate transfer member 28. Waste toner left after the four-color toner image formed on the intermediate transfer member 28 is transferred onto the printing medium 11 is deposited in a cleaner container. As described above, the tandem color LBP includes an image forming unit including a printing unit 415 and a scanner unit 414 for each color component.

Profile Characteristic of Scan Line

Profile characteristics of actual color scan lines of the image forming apparatus will be described with reference to FIGS. 3A to 3B. A skew characteristic 302 in FIG. 3B indicates an actual scan line with an inclination and skew caused by a positional inaccuracy and radial misalignment of photosensitive drums 22 and a positional inaccuracy of the optical system in the scanner unit 414 (414C, 414M, 414Y, 414K) shown in FIG. 2. Image forming apparatuses vary in profile characteristic due to differences in recording devices (recording engines). Furthermore, the profile characteristics of a color image forming apparatus vary from color to color.

Figure 3A:
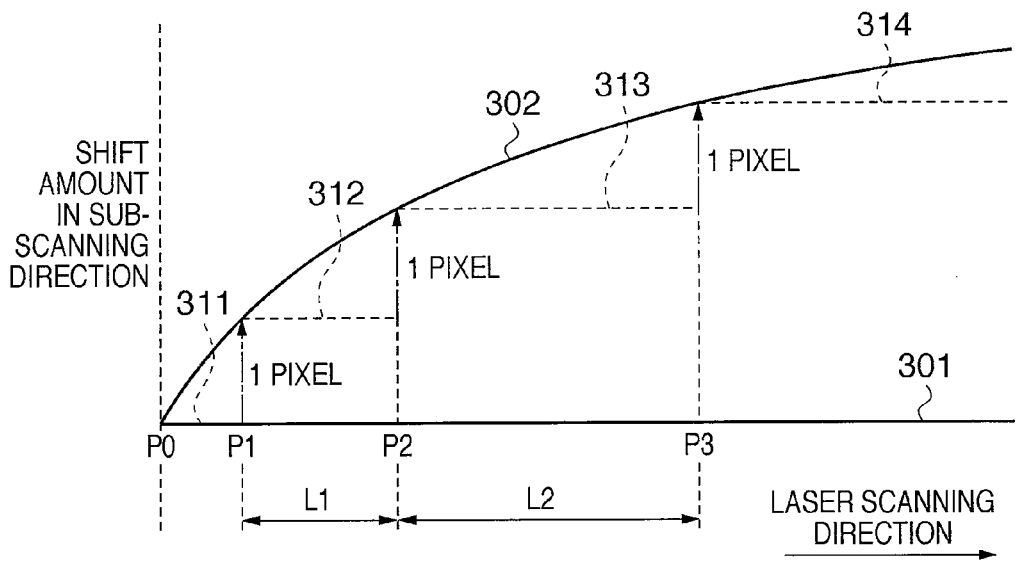
FIGS. 3A and 3B show profile characteristics of color scan lines in an image forming apparatus.
Figure 3B:
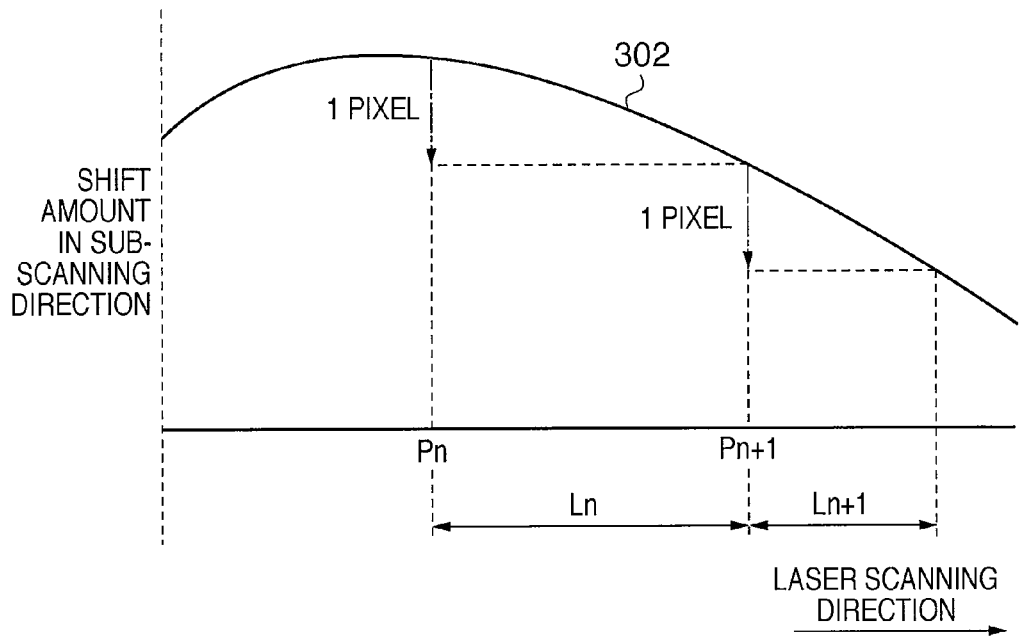

FIG. 3A shows part of a profile characteristic of the image forming apparatus and shows an area where the profile is shifted upward in the sub scanning direction. FIG. 3B shows an area where the profile is shifted downward in the sub scanning direction. The abscissa 301 represents an ideal scan line and indicates a characteristic that would appear when scanning is performed perpendicularly to the direction of rotation of the photosensitive drum 22, that is, in the direction parallel with the rotation axis. While the profiles are represented in graph form in FIGS. 3A and 3B, profiles stored as profile information 416 are discrete data. For example, whenever the actual scan line starting from the starting point P0 moves away from or closer to the ideal scan line by one pixel, the position of the scan line and the direction of the movement indicating the scan is moving away from or closer to the ideal line are stored in association with each other. The position may be indicated by any information that identifies where the pixel appear in a sequence in the direction of the scan line. The skew characteristic (also called profile) 302 is approximately represented by line segments 311, 312, 313, 314 in profile information. The information suffices for correction of registration errors.

The profile characteristic will be described on the basis of the direction in which correction should be made in the image processing unit 402. However, the representation is merely a convention herein and any representation may be used that can uniquely identify the amount and direction of shift. For example, the profile characteristic may be defined as the direction of misregistration of the color image forming unit 401 and the image processing unit 402 may correct the characteristic in the opposite direction.

Figure 7A:
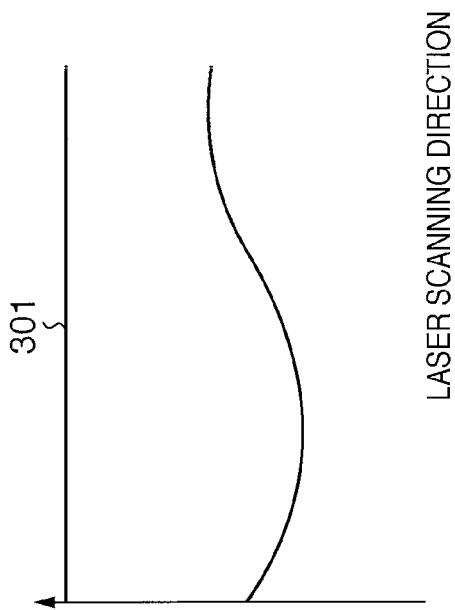
FIGS. 7A to 7D show the correlations between direction in which correction is to be made in an image processing unit 402 and direction of misalignment in an image forming unit 401, represented by profile definitions.
Figure 7B:
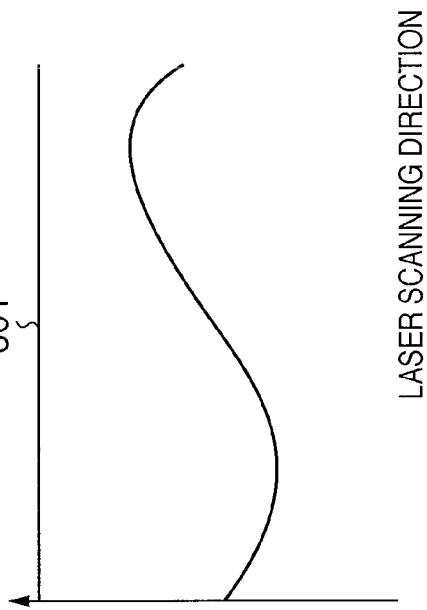
Figure 7C:
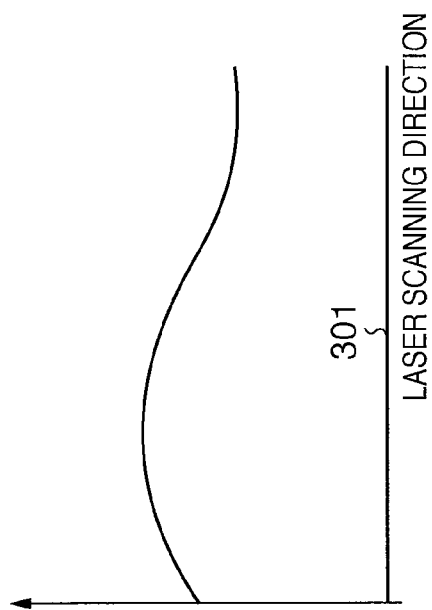
Figure 7D:
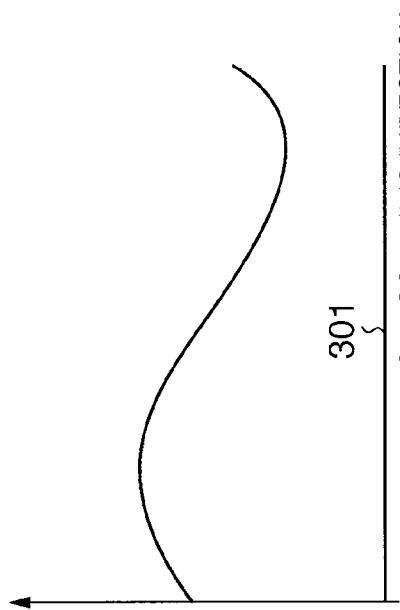

FIGS. 7A to 7D show the correlation, represented in profile definition, between the direction in which correction should be made in the image processing unit 402 and the direction of shift of a scan line in the color image forming unit 401. When the profile characteristic of the color image forming unit 401 is indicated as shown in FIG. 7A, the image data is shifted in the opposite direction, namely in the sub scanning direction, in the image processing unit 402 as shown in FIG. 7B. When the profile characteristic of the color image forming unit 401 is indicated as shown in FIG. 7C, the image data is shifted in the sub scanning direction in the image processing unit 402 as shown in FIG. 7D. The shift amount is based on the abscissa 301, namely the ideal scan line.

The profile characteristic data (profile information) includes the position of the pixel at a scan line changing point in the main scanning direction and the direction in which the scan line changes before the next scan line changing point as shown in FIGS. 9A to 9D, for example. In particular, scan line changing points P1, P2, P3, . . . , Pm are defined for the profile characteristic shown in FIG. 9A. A scan line changing point is defined as a point at which a one-pixel undesirable shift of the scan line occurs in the sub scanning direction. The line may change upward or downward before the next scan line changing point. For example, the scan line is shifted upward at scan line changing point P2 in the figure. That is, P2 is a point at which a changeover is to be made from the current line to the line immediately below the current line. The direction of shift at position P2 is upward (↑) as shown in FIG. 9B. In the image processing, a changeover made to the line immediately below the current line. The direction of shift at position P3 is also upward (↑). The direction of shift at scan line changing point P4 with respect to the sub scanning direction is downward (↓). Here, "1" is held as data indicating the upward direction and "0" is held as data indicating the downward direction, for example, as shown in a hold table 903 in FIG. 9C. The number of bits of the data held in this case is equal to the number of scan line changing points. If the number of scan line changing points is m, m bits of data are held. A phase shift table in FIG. 9C shows pixel positions at which scan lines are shifted. In this table, "0" means the current scan line and, other numerals indicate shifted line positions relatively to the current line.

Scan Line Changing Points

Scan line changing points in an area where a scan line is misaligned upward with respect to the laser scanning direction will be described with reference to FIG. 3A. A scan line changing point in the present exemplary embodiment represents a point at which the scan line is shifted (misaligned) by one pixel in the sub scanning direction. That is, points P1, P2, and P3 in FIG. 3A at which the scan line is misaligned by one pixel in the sub scanning direction on the upward skew characteristic 302 represent scan line changing points. In FIG. 3A, point P0 is the reference point. As can be seen from FIG. 3A, the distance (L1, L2) between scan line changing points is shorter in an area where the skew characteristic changes steeply and is longer in an area where the skew characteristic changes modestly.

Scan line changing points in an area where a line is misaligned downward with respect to the laser scanning direction will be described next with reference to FIG. 3B. Again, a scan line changing point in an area where the characteristic indicates a downward misalignment is defined as a point at which the scan line is shifted (misaligned) by one pixel in the sub scanning direction. Points Pn and Pn+1 on the downward skew characteristic 302 in FIG. 3B that are misaligned by one pixel in the sub scanning direction represent scan line changing points. As with FIG. 3A, the distance (Ln, Ln+1) between scan line changing points in FIG. 3B is shorter in an area where the skew characteristic changes steeply and longer in an area where the skew characteristic changes modestly.

In this way, scan line changing points closely relates to the degree of change in the skew characteristic 302 of the image forming apparatus. Accordingly, in an image forming apparatus having a steep skew characteristic, there will be more scan line changing points; in an image forming apparatus having moderate skew characteristic, there will be less scan line changing points.

The skew characteristics vary among the color image forming units and so do the number and positions of scan line changing positions. The differences in the profile of scan lines among the colors will appear registration errors in an image generated by transferring toner images of all colors on the intermediate transfer member 28. The present invention relates to processing at the scan line changing points.

Image Processing Unit of Tandem Color Lbp

The image processing unit 402 in the color image forming apparatus will be described with reference to FIG. 4. An image generation unit 404 generate printable raster image data from print data received from a device such as a computer, not shown, and outputs, pixel by pixel, the raster image data as RGB data and attribute data indicating data attributes of the pixels. The image generation unit 404 may handle image data from a reading unit provided within the color image forming apparatus, instead of image data received from a device such as a computer. A color conversion unit 405 converts RGB data to CMYK data according to the toner colors of color image forming units 401, and stores the CMKY data and attribute data in a storage unit 406. The storage unit 406 is a first storage unit provided in the image processing unit 402 and temporarily stores dot image data to be printed. The storage unit 406 may be implemented by a page memory which stores one page of dot image data or a band memory which stores multiple lines of data. The dot image data is also called raster image data.

Halftoning units 407C, 407M, 407Y and 407K apply halftoning to the attribute data and color data output from the storage unit 406. Specific examples of configurations of halftoning units include those performing a screening process (that is, dithering) and those performing an error diffusion process. The screening process is a process that converts input image data to N-value image data by using a predetermined number of dither matrices. The error diffusion process is a process in which input image data is compared with a predetermined threshold value to convert the input image data to N-value image data and the difference between the input image data and the threshold value is diffused to neighboring pixels to be subsequently converted to N-value data. The screening process is performed in the present exemplary embodiment. In the present exemplary embodiment, N is equal to 2 and the number of bits per pixel is 4. That is, a pixel value is converted to 0 or 15 by quantization.

A second storage unit 408 is provided in the image forming apparatus and stores N-value (halftone image) data processed by the halftoning unit 407 (407C, 407M, 407Y, 407K). When a scan line changing point is at a pixel location to be subjected to image processing in a processing block located downstream from the second storage unit 408, scan line changing by one line is performed at the time point at which data is read from the second storage unit 408. In particular, rather than advancing the address of the dot to read to the next dot, the address is further advanced by one line from the next dot or is set back by one line. Whether to advance or set back by one line depends on the direction of shift (misalignment).

Figure 8A:
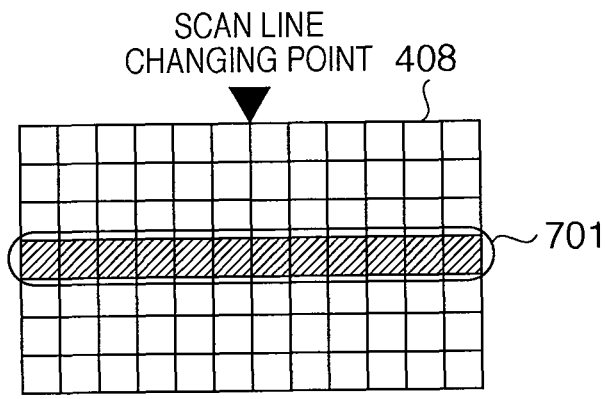
FIGS. 8A to 8C schematically show the states of data held in a storage unit 408.
Figure 8B:
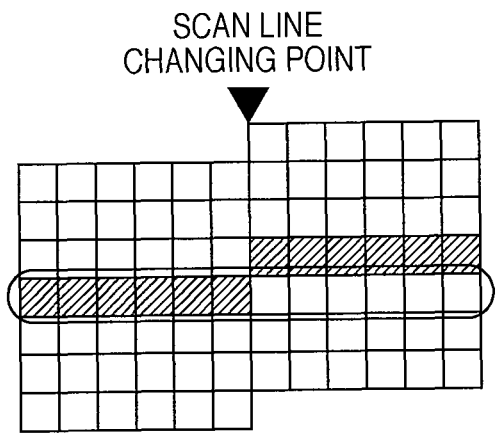
Figure 8C:
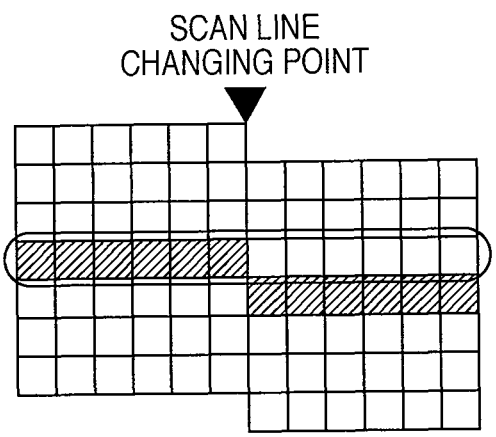

FIG. 8A schematically shows data held in the storage unit 408 shown in FIG. 4. As shown in FIG. 8A, the storage unit 408 holds data processed by the halftoning units 407C, 407M, 407Y, 407K without regard to the direction of correction by the image processing unit 402 and the skew characteristic of the scan line in the image forming unit 401. At the time point when the line 701 in FIG. 8A is read, if the direction of the profile characteristic to be corrected in the image processing unit 402 is downward, the line 701 is shifted by one pixel upward at the scan line changing point as shown in FIG. 8B. If the direction of the profile characteristic to be corrected by the image processing unit 402 is upward, the line 701 is shifted by one pixel downward at the scan line changing point as shown in FIG. 8C at the time point at which the image data of the line 701 is read from the storage unit 408.

An interpolation determining units 409C, 409M, 409Y, 409K for each color determines whether pixels around a scan line changing point in input N-value data requires interpolation in a subsequent process. Timing adjustment units 410C, 410M, 410Y, 410K brings N-value data read from the storage unit 408 into synchronization with the result of determination by the interpolation determining units 409C, 409M, 409Y, 409K. Transfer buffers 411C, 411M, 411Y, 411K temporarily holds data output from the interpolation determining units 409C, 409M, 409Y, 409K and the timing adjustment units 410C, 410M, 410Y, 410K. While the first storage unit 406, second storage unit 408, and the transfer buffers 411C, 411M, 411Y, 411K have been described as separate components, they may be provided as a common storage unit in the image forming apparatus.

Each of interpolation units 412C, 412M, 412Y, 412K performs an interpolation process on data received from each the transfer buffers 411C, 411M, 411Y, 411K on the basis of the result of determination by each of the interpolation determining units 409C, 409M, 409Y, 409K which is also transferred from the transfer buffers 411C, 411M, 411Y, 411K. While the result of determination from the interpolation determining unit 409C, 409M, 409Y, 409K is the result of determination made for each pixel, the interpolation process in the interpolation unit 412C, 412M, 412Y, 412K uses the pixels around a scan line changing point in the profile (i.e., skew characteristic) of the image forming apparatus. FIGS. 5A to 5G show a method of interpolation at a scan line changing point (FIGS. 5A to 5G will be collectively referred to as FIG. 5).

Interpolation Process (1)

Figure 5A:
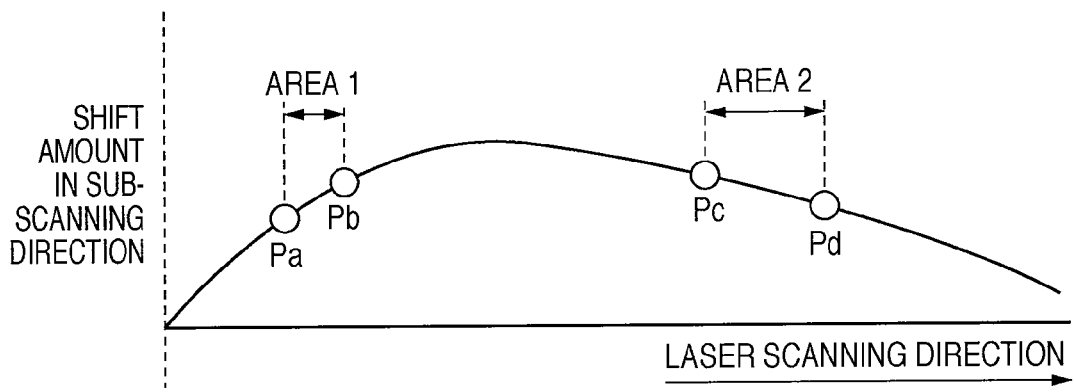
FIGS. 5A to 5G are diagrams showing skew characteristics of the image forming apparatus with respect to the laser scanning direction and a method for correcting the skews.

FIG. 5A shows a skew characteristic of a scan line of the image forming apparatus with respect to the laser scanning direction. Area 1 requires a downward correction by the image processing unit 402 whereas area 2 requires an upward correction by the image processing unit 402. For convenience of explanation, it is assumed in the following description of the interpolation process that the minimum distance between scan line changing points is 16 pixels. However, the present invention is not limited to this. The minimum distance may be equal to any number of pixels. In order to reduce the circuitry, the number of pixels may be equal to a power of 2. The interpolation described below, that is, smoothing, is performed on 16 pixels preceding a scan line changing point in the main scanning direction. If the distance between scan line changing points is greater than 16 pixels, the portion before (in FIGS. 5A-5G, the portion to the left of) the smoothed area will be left unsmoothed. A distance of 16 pixels is chosen because one pixel in binarized data consists of 4 bits in this example and the image forming unit has the ability of representing 16 tone levels. By changing the tone of each pixel value by one tone level, a step between lines can be smoothed.

Figure 5B:
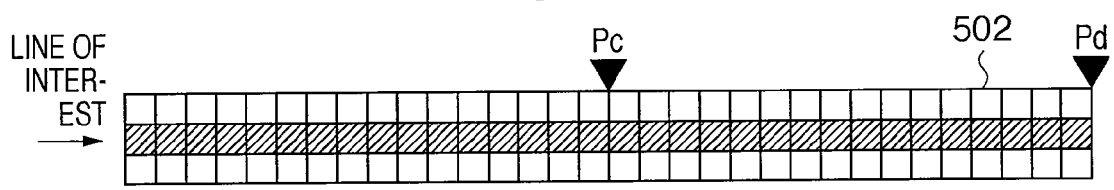

FIG. 5B shows an image 502 around a scan line changing points Pc before a scan line changeover in the example in FIGS. 5A to 5G, that is, halftone image data output from the halftoning unit. The line of interest is the line at the center of the three lines of image data shown. Data 503 after the scan line changing of the line of interest by one pixel, that is, image data output from the storage unit 408, is shown in the upper part of FIG. 5C. Because the scan line changing process is performed at the time point when the data is read from the storage unit 408, the arrangement of pixels preceding and succeeding the scan line changing point Pc appears as a step of one line height at the scan line changing point Pc when the image data is input in the interpolation unit 412.

The interpolation units 412C, 412M, 412Y, 412K apply the interpolation process to image data of the respective component colors that appears as a step on the line of interest. Because the direction of correction in area 1 is upward, the interpolation process of the line of interest is performed by using a weighting operation with image data of the subsequent line. The weighting herein is such that the sum of the values of two pixels of interest in the sub scanning direction is 16, which is equal to the minimum distance between scan line changing points, as shown in a weight table 504 in the lower part of FIG. 5C. Of course, this is an example and the sum of pixel values is not limited to 16. In order to reduce the size of the circuitry used for the computation, the sum may be a power of 2 or, in order to increase the precision, the sum may be calculated by using a given factor. Furthermore, different weighting factors may be used for different pixels as will be described later. Alternatively, a common weighting factor may be used for a number of pixels as shown in FIGS. 16A to 16H. Furthermore, the number of pixels associated may be varied according to the value of the weighting factor. A scan line changing point is defined as a position on the main scan line at which a one-pixel shift occurs in the sub scanning direction. Therefore, it is assumed in the following description that the reference position in interpolation is the starting point of the main scanning, namely the leftmost point. An equation used for interpolation is shown below (Equation 1), where x represents the position of a pixel of interest in the main scanning direction and y represents the position of the pixel of interest in the sub scanning direction. The pixel value is denoted by p and the pixel value after correction is denoted by p'.

$$P'(x, y) = w1*p(x, y-1) + w2*p(x, y) + w3*p(x, y+1) \quad \text{(Equation 1)}$$

Figure 5C:
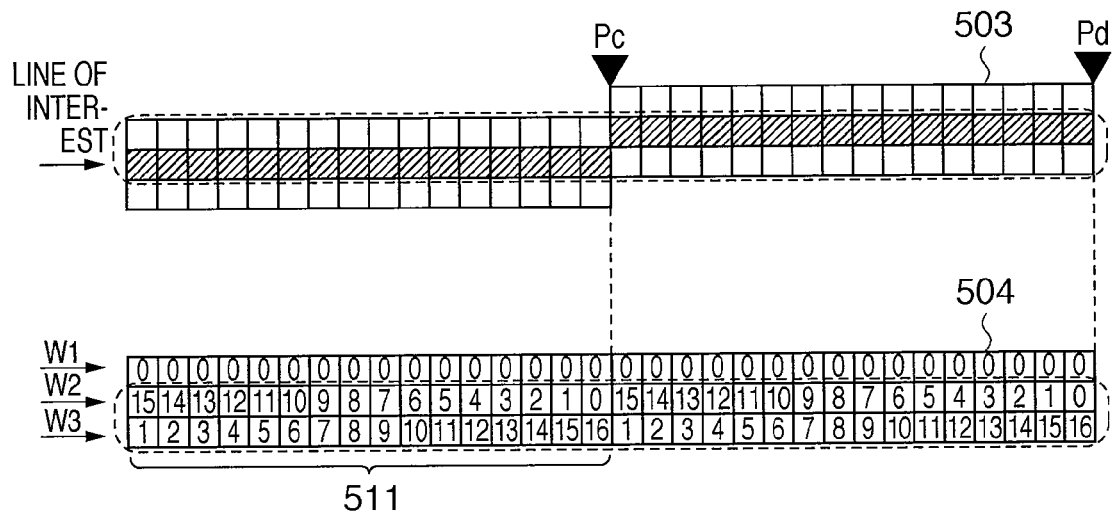

Here, W1, W2, and W3 are weighting factors with a common x-coordinate. In this example, the weighting factors are defined as a factor matrix of 3×16 pixels as shown in the lower part of FIG. 5C. The factor matrix in the lower part of FIG. 5C is designed for making a shift to the line above the line of interest at the scan line changing point. The factors on the line immediately above the line of interest are all 0. The factor values for the pixels on the line of interest (the center line in FIG. 5C) decreases by $\frac{1}{16}$, from $\frac{15}{16}$ to $\frac{0}{16}$ (the denominator is omitted from FIG. 5C), from left to right. The factor values for the pixels on the line immediately below the line of interest increases by $\frac{1}{16}$, from $\frac{1}{16}$ to $\frac{16}{16}$, from left to right. The factor matrix is associated with the block of 3×16 pixels centered at the line of interest immediately before (to the right of) the scan line changing point and the corrected pixel values can be obtained according to Equation 1. The pixel values before the correction are replaced with the corrected pixel values. This operation is performed on all lines of the image data to be processed. Equation 1 is used for obtaining the weighted mean of the value of a pixel of interest and the values of the pixels on the lines above and below the pixel.

Figure 5D:
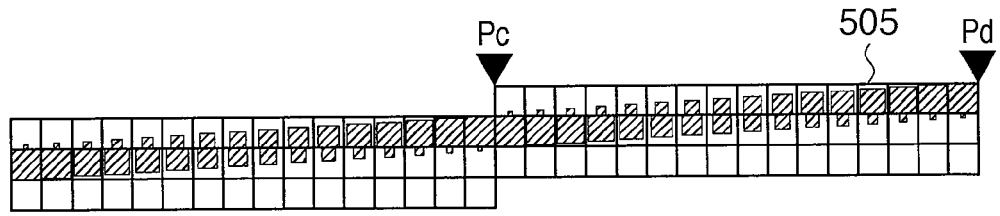

FIG. 5D is a conceptual diagram 505 of interpolated pixel values obtained by applying Equation 1 to the image data in FIG. 5B. As a result of the interpolation according to Equation 1, before the scan line changing point Pc, the pixels nearer to the scan line changing point Pc are more affected by the pixel values on the subsequent line and the pixels farther from (to the left of) the scan line changing point Pc are more affected by the line of interest, that is, the black data line.

In the pixels after the scan line changing point Pc, the pixels nearer to the scan line changing point Pc are more affected by the image data on the previous line of the line of interest and the pixels farther from the scan line changing point are more affected by the subsequent line of the line of interest. Here, the previous line of the line of interest is the original line of interest that has become the previous line data because of the step created by the process of scan line changing by more than one pixel. In the example, the pixels other than the 16 pixels preceding the scan line changing point are excluded from the interpolation process and the image data of those pixels is not smoothed.

Area b in which downward correction should be performed will be described next. For downward correction, weighting factors used for computation of corrected pixel values are set on the line of interest and the previous line of the line of interest.

Figure 5E:
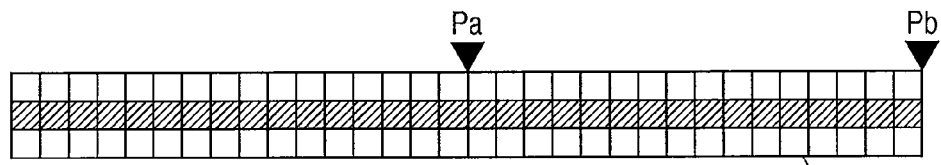
Figure 5F:
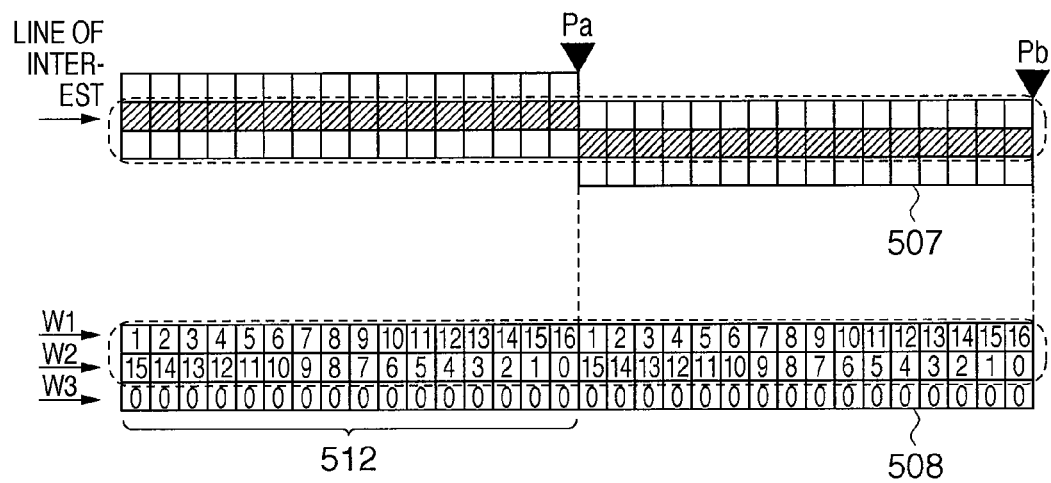
Figure 5G:
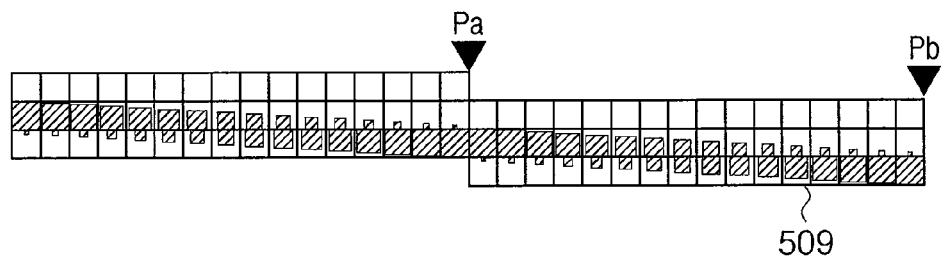
Figure 6A:
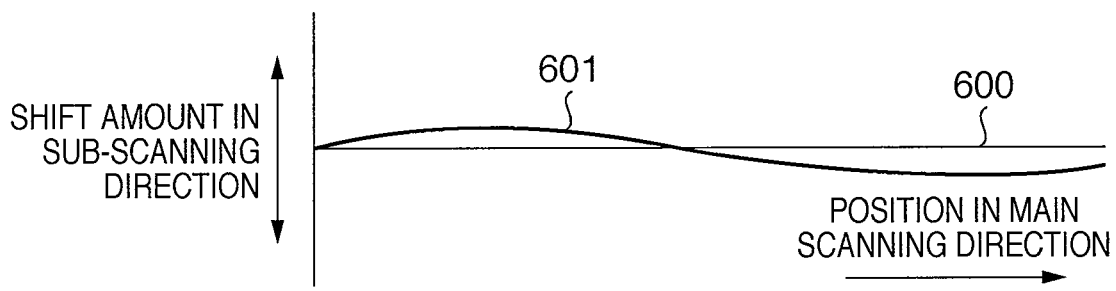
FIGS. 6A to 6D show examples of skew profiles of scan lines.
Figure 6B:
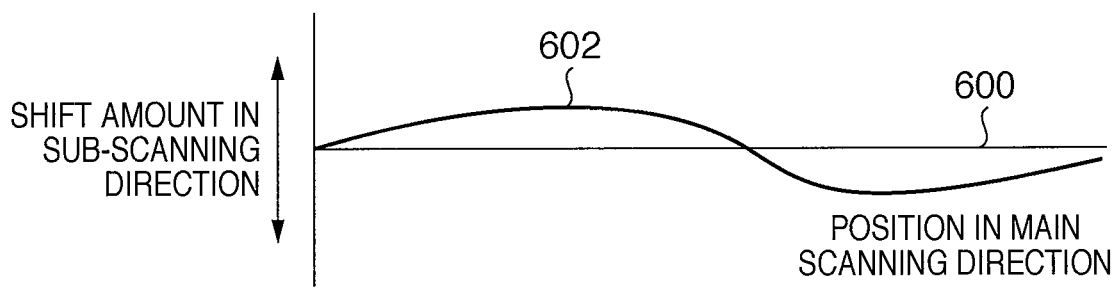
Figure 6C:
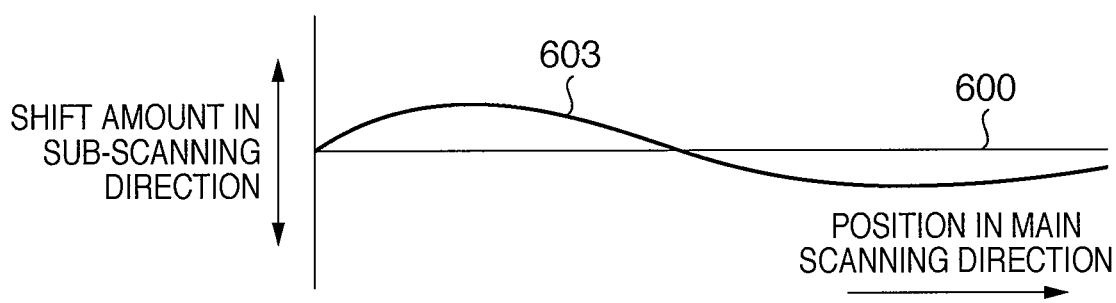
Figure 6D:
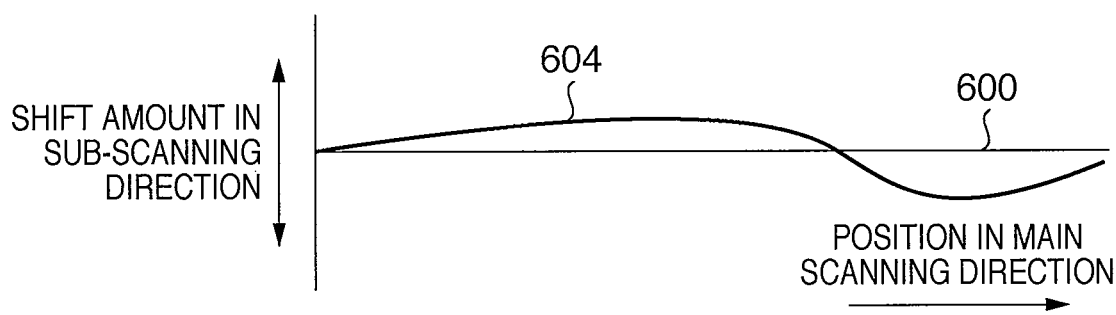

FIG. 5E shows image data 506 just output from the halftoning unit 407. An example of image data 507 just read by the storage unit 408 is shown in the upper part of FIG. 5F. Because downward correction is made at the scan line changing point Pa, a scan line changing step greater than one pixel appears at the scan line changing point Pa as shown in an image 507 in the upper part of FIG. 5F. The values of W1, W2, and W3 for the downward correction are shown in a table 508 in the lower part of FIG. 5F. For convenience of explanation, the sum of weighting factors is 16 as with the upward correction. By applying Equation 1 to the downward correction, corrected pixel values before and after the scan line changing point Pa can be obtained. That is, before the scan line changing point Pa, the pixels nearer to the scan line changing point Pa are more affected by the values of the pixels of the previous line and the pixels father from the scan line changing point Pa are more affected by the line of interest. In the pixels after the scan line changing point Pa, the pixels nearer to the scan line changing point Pa are more affected by the line of interest and the pixels farther from the scan line changing point Pa are more affected by the previous line of the line of interest (see an image 509 in FIG. 5G). The interpolation process in the example is applied to the 16 pixels preceding the scan line changing point. Because the distance between the scan line changing points Pa and Pb is equal to 16 pixels as shown in FIG. 5G, the portion around the scan line changing point Pa is apparently smoothed but the farther portions are not smoothed after the scan line changing point Pa.

In this way, the interpolation process both in upward and downward directions by the interpolation unit 412 prevents continuous pixel data running in the main scanning direction from appearing as a large step due to a scan line changing step exceeding one pixel.

A Pulse Width Modulation (PWM) unit 413 converts image data of each color output from the interpolation unit 412 to an exposure time for a scanner unit 414C, 414M, 414Y, 414K. The converted image data is output on printing unit 415 in the image forming unit 401. The profile characteristic data described with reference to FIGS. 9A to 9D is held in the image forming unit 401 as characteristics of the image forming apparatus (profiles 416C, 416M, 416Y, and 416K). The image processing unit 402 performs the scan line changing process and interpolation process in accordance with the profile characteristic data held by the image forming unit 401.

An example of the interpolation process is shown in FIG. 1. As illustrated in FIG. 1, the tone values of bitmap image data are corrected by adjusting them using neighboring pixels in the sub scanning direction. In particular, when the characteristic indicates an upward inclination like profile 2601, the bitmap image data before tone correction is corrected so that pixel sequences 2603 inclined in the direction (downward in this example) opposite to the inclination of the profile results (as shown in FIG. 1C). FIG. 1B shows the bitmap image data before the correction. The image data 2602 is shifted in the sub scanning direction at scan line changing points P1, P2 and so on by one pixel at a time (FIG. 1F). In order to approximate the image data 2602 to corrected, ideal image data 2603, tone correction is applied to smooth the steps at the scan line changing points P as shown in FIG. 1D. FIG. 1D is a diagram schematically showing the density of each pixel by the width or intensity of a laser pulse for forming the pixels. After exposure, a latent image as shown in FIG. 1E is formed, in which the steps caused by the scan line changing process have been smoothed.

Interpolation Process (2)

Figure 10:
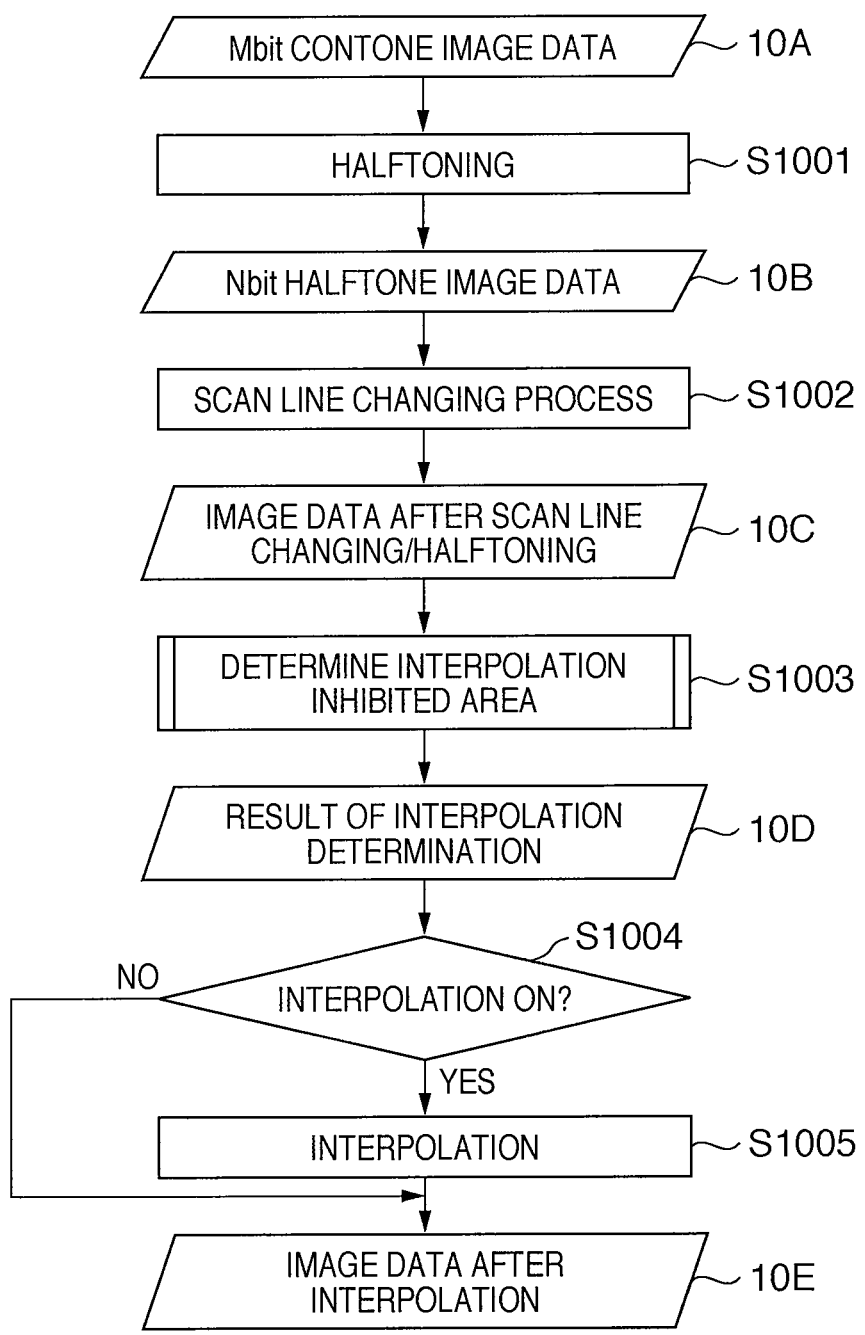
FIG. 10 is a flowchart of a main process according to a first exemplary embodiment.
Figure 11:
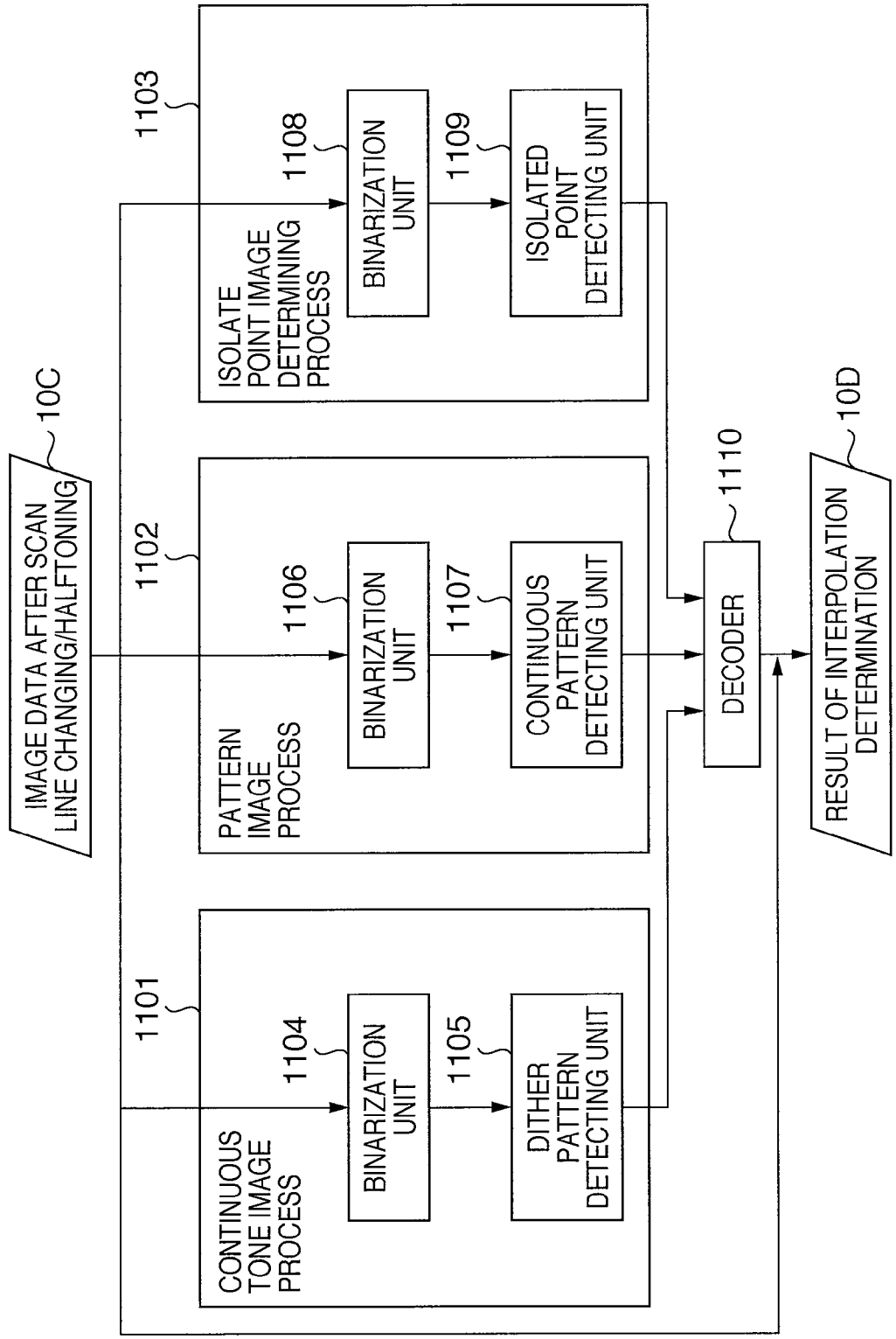
FIG. 11 is a block diagram showing details of interpolation inhibited area determination at step S1003.

The most distinctive feature of the present exemplary embodiment will be further described with reference to other drawings. FIGS. 10 and 11 are flowcharts of an exemplary system, which are one feature of the present exemplary embodiment, for determining an interpolation inhibited area in image data after halftoning and scan line changing processes. The processes in the flowcharts are performed by the apparatus having the configuration shown in FIG. 4.

FIG. 10 is a flowchart illustrating a process performed in the halftoning unit 407, the interpolation determining unit 409, and the interpolation unit 412. FIG. 11 is a block diagram detailing a process performed in the interpolation determining unit 409. With reference to FIGS. 10 and 11, the halftoning, interpolation determining process, and interpolation process will be described in detail.

At step S1001, the halftoning unit 407C, 407M, 407Y, 407K performs halftoning on M bits of continuous tone image data (also referred as contone image data) 10A in image data of each color component. The halftoning is performed by a screening or error diffusion process. As a result, quantized N-bit halftone image data 10B is output. Here, M and N are natural numbers, where M>N. In the example, a screening process using dither matrices will be described by way of example. The process then precedes to step S1002. In the following description, like components for the different color components will be sometimes collectively denoted by reference numerals without the symbols of the color components.

At step S1002, a scan line changing process is performed at the timing at which image data is read from the storage unit 408 under the read timing control of the timing adjustment unit 410. This is a process in which pixel-wise coordinate position conversion is performed at scan line changing points. The process then proceeds to step S1003.

At step S1003, the interpolation determining unit 409C, 409M, 409Y, 409K determines an interpolation inhibited area (interpolation inhibited area determination). Details of the processing at step S1003 will be described later with reference to FIG. 11. After the determination, the result of interpolation determination 10D describing whether interpolation is to be performed (hereinafter referred to as "Interpolation determination flag ON") or not (hereinafter referred to as "Interpolation determination flag OFF") is output and then the process proceeds to step S1004. An interpolation inhibited area is an area in which the interpolation process at scan line changing points is not performed and for which the interpolation determination flag is OFF.

At step S1004, the result of interpolation determination 10D is referred to and the following process is performed. If the result of determination for a pixel of interest is "Interpolation determination flag ON", the process proceeds to step S1005, where the interpolation process is performed in the interpolation unit 412 and then the process proceeds to the next pixel. On the other hand, if the result of the determination is "interpolation flag OFF", the process proceeds to the next pixel without performing the interpolation process. After the interpolation process of all pixels to be processed is completed, image data 18E subjected to the interpolation process is output and then the process will end. Determination at step S1004 is made by the interpolation unit 412 which has received the result of interpolation determination 10D.

Determination of Interpolation Inhibited Area

The process performed by the interpolation determining unit 409C, 409M, 409Y, 409K at step S1003 will be described in detail with reference to FIG. 11. The interpolation determining unit 409 (collectively described for all the color components) uses halftone image data 10C that underwent the line changing and halftoning as an input. Then, three units, a continuous tone image determining unit 1101, a pattern image determining unit 1102, and an isolated point image determining unit 1103, in the interpolation determining unit 409 separately make determination as to whether interpolation is to be performed.

The continuous tone image determining unit 1101 will be described first. In a binarization unit 1104, the input image 10C is binarized. The input image may be binarized using a predetermined threshold value or using the average of the values of neighboring pixels as a threshold value. The binarized image is provided to a dither pattern detecting unit 1105.

The dither pattern detecting unit 1105 determines whether the binarized image matches a dither pattern (dither matrix pattern) registered beforehand. That is, the dither pattern detecting unit 1105 detects a periodicity of the dither pattern in the image data. The determination is made by using run length matching or template matching to detect a dither pattern in the image of each color component. For example, in the case of run length matching, it may be determined that the image is a continuous tone image if pixel sequences of a given pattern (called run) including pixels with values of 1 and 0 are detected in succession. In the case of template matching, pattern matching between screen patterns stored beforehand for each color component and image data of the color component may be performed to obtain the result of the determination. The screen patterns are determined by dither matrices used for a screening process. Predefined dither matrices are usually used in the screening process and therefore the screen patterns can be known in advance. The screen patterns can be stored as screen angles, for example. Contour extraction of a given screen angle can be accomplished by filtering. If pattern matching shows that the area of an extracted continuous tone image object exceeds a certain percentage, for example 50%, of the area of the entire image, the image may be considered as a continuous tone image. This process of determining the type of an image (continuous tone image, pattern image, or a isolated point image) is sometime called image attribute determining process. If it is determined that an area of the image data matches a dither pattern of a registered image of the component colors, a continuous tone image determination flag is associated with the position and the range of the matched area and is set to ON. Alternatively, determination is made as to whether the image area of interest includes a scan line changing point. If it includes, a continuous tone image determination flag is associated with a line identifier (for example the line number of the image data) including the image area of interest and the position of the scan line change point and is set to ON and returned. If a continuous tone image determination flag is associated with pixel, a bitmap of continuous tone image determination flags associated with the pixels of the image data can be formed. It is assumed in this example that such a bitmap is generated.

On the other hand, in the case of run length matching, a run that crosses a line changing point can be broken at the line changing point and cannot match a pattern. Therefore, a "scan line changing point process" is performed as an exceptional process. An example will be described below with reference to FIGS. 13A and 13B. Suppose that a matching process is being performed on a line of interest having a pattern 1310 as shown in FIG. 13A. The pattern of the run is "11000" (shaded boxes represent pixels with the value 0). A run 1301 is detected in the area 1301 before a scan line changing point and the detection determining flag indicating the run has been detected is turned ON. In this case, a run 1302 that crosses the scan line changing point is considered as a run regardless of the pattern of the run and its continuous tone image determination flag is turned ON. The continuous tone image determination flag is associated and stored with the position and range of the area (run) of interest. If the continuous tone image determination flags of areas 1303 and 1305 before and after a run 1304 that crosses a scan line changing point are ON in a block 1320 in FIG. 13B, the continuous tone image determination flag of the run 1304 crossing the scan line changing point is also tuned ON. This process can improve the accuracy of determination of a scan line changing point. A scan line changing point is determined by a profile characteristic of the image forming unit for each color that has been measured beforehand. Therefore whether a run of interest crosses a scan line changing point can be determined on the basis of the profile characteristic. The continuous tone image determination flag is associated and stored with the position and range of an area of interest. In this example, a bitmap data of flags associated with pixels is generated. Upon completion of the determination on the entire image, the result of the determination is sent to a decoder 1110. Of course, the determination is made for the entire imaged data that is output at a time. In the case of a page printer for example, the determination is made for image data of each color component that constitutes one page. The same applies to a pattern image determining process and an isolated point image determining process.

The pattern image determining unit 1102 will be described next. First, binarization is performed at a binarization unit 1106. The binarization method is the same as that in the continuous tone image determining unit 1101 and therefore a description of it will be omitted. Then, determination is made at a continuous pattern detecting unit 1107 as to whether an area in the image matches a pattern image template registered beforehand. The determination can be made by performing pattern image detection by using run length matching or template matching. If the area matches a registered template, a pattern image determination flag associated with the area of interest is turned ON and is returned as the result of the determination.

Figure 17:
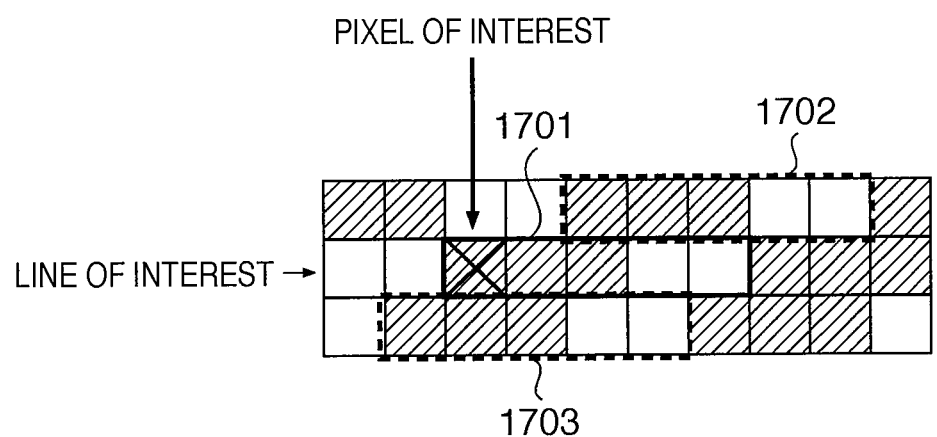
FIG. 17 shows an example of a process for determining a pattern image.

An example of run length matching is shown in FIG. 17. If a run 1701 that matches a registered pattern is found on a line of interest, determination is made as to whether there is the same run in a phase on the lines above and below the line of interest. In the example in FIG. 17, a run 1703 has been found on the line below the line of interest in the phase shifted (advanced) by one pixel from the run 1701 detected on the line of interest and a run 1702 has been found on the line above the line of interest in the phase delayed by two pixels from the run 1701. In this case, the pattern image determination flags of the pixels of the run 1701 are turned ON and are returned as the result of the determination. That is, the pattern image determination flags are associated with the area of the run 1701 and are returned as the result. The pattern image determination flags are also generated as bitmap data associated with the pixels of the image data.

In the pattern image determining process, a discontinuity of a run can occur at a scan line changing point as described with respect to the continuous tone image determining unit 1101. Therefore, the discontinuity in the result of determination is avoided by performing the scan line changing point process. That is, if the area immediately before an area including a scan line changing point is found to a pattern image, the area including the scan line changing point is considered as including a run of a predetermined pattern. Accordingly, a pattern image flag associated with the area is turned on. If it is determined that the areas immediately before and after the area including a scan line changing point is found to be a pattern image, the area including the scan line changing point is considered as including a run of a predetermined pattern. After the determination on the entire image is completed, the result of determination is sent to the decoder 1110.

An isolated point image determining unit 1103 will be described next. First, binarization is performed at a binarization unit 1108. The binarization method may be a simple binarization using a preset threshold value. Then, determination is made at an isolated point detecting unit 1109 as to whether an area of the image matches an isolated point pattern registered beforehand. An example of the method may be isolated point pattern detection using template matching. A number of isolated point patterns as shown as patterns 1601 to 1608 in FIGS. 16A to 16H are registered beforehand as templates. If it matches one of the registered templates, isolated point determination flags of the pixels at the isolated point and on the lines above or below it (that is, the area corresponding to one of the templates in FIGS. 16A to 16H) are turned ON and are returned as the result of determination. After the determination is completed on the entire image, the result of the determination is sent to the decoder 1110.

The decoder 1110 uses the three attribute determination results as inputs and outputs the ultimate result of interpolation determination 10D. As means for the determination, a decoder lookup table (LUT) as illustrated in FIG. 14 may be used. Stored in the LUT beforehand are indications of which of ON and OFF should be output as the results of interpolation determination 1402 depending on combinations of ON and OFF of the three attribute determination flags 1401. The decoder LUT is used to output the result of interpolation determination for each pixel of the input image from the three attribute determination results for the pixel. After the determination for all pixels is completed, the process will end. The interpolation process of a continuous tone image decreases the quality of the image. Therefore, if only the continuous tone image determination flag is ON, OFF is output as the result of interpolation determination. The interpolation process of a pattern image improves the quality of the image. Therefore, if only the pattern image determination flag is ON, ON is output as the result of interpolation determination. The interpolation process of an isolated point is useless. Therefore, if only the isolated point determination flag is ON, OFF is output as the result of interpolation determination. FIG. 14 shows an example of interpolation determination.

As a result of the process, a bitmap of the interpolation determination flags is generated. Areas where the interpolation determination flags are turned off are interpolation inhibited areas.

The values to be set in the decoder LUT (table in FIG. 14) vary depending on which of the qualities of a continuous tone image and pattern image is a higher priority. Therefore, more than one decoder LUT may be provided and one of them may be selected to use in each job.

With the method described above, areas where interpolation should be performed and areas where interpolation should not be performed can be determined even for an image that underwent halftoning and line changing process. Thus, an appropriate interpolation process can be performed.

Determination Process for Error-Diffused Image Data

A case where an error diffusion process has been performed in halftoning will be described next. Determination as to whether an image is a continuous tone image, pattern image, or isolated point described with respect to FIG. 11 cannot be made for an image that underwent an error diffusion process. However, if interpolation is not performed, roughness at the edges of an image such as a patch (rectangular) image will be noticeable. Therefore, a determination process for detecting and interpolating edges of an image is performed.

Figure 12:
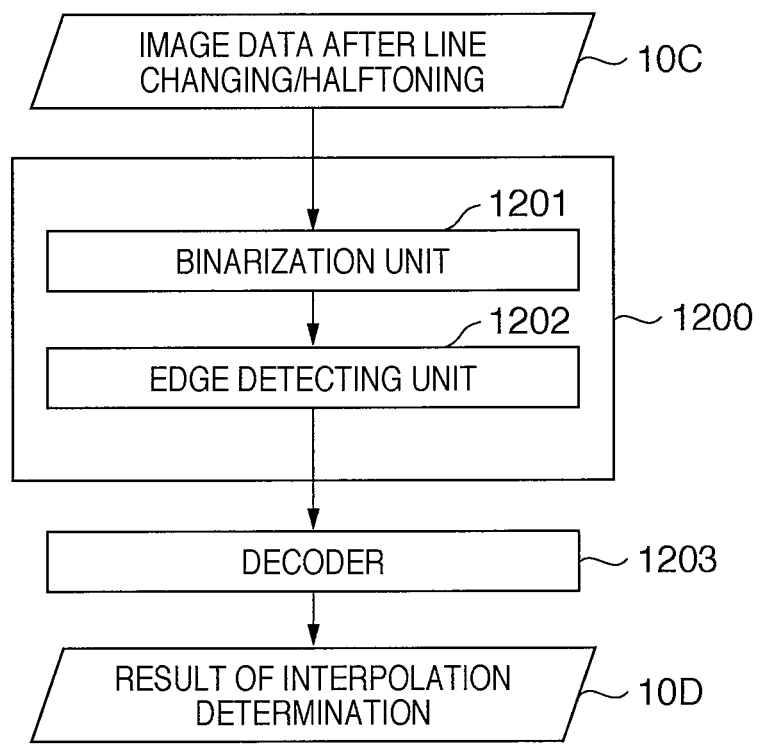
FIG. 12 shows details of interpolation inhibited area determination after an error diffusion process is performed as halftoning.

FIG. 12 is a block diagram illustrating a process for determining interpolation inhibited areas performed when an error diffusion process is selected as the halftoning in FIG. 10. If the halftoning is error diffusion, an error-diffused image determining unit 1200 is used instead of the continuous tone image determining unit 1101 shown in FIG. 11. A binarization unit 1201 binarizes image data 10C that underwent scan line changing and halftoning. The binarization method is the same as that performed by the binarization unit 1108 of the isolated point image determining unit 1103 and therefore the description of it will be omitted. The process then proceeds to an edge detecting unit 1202. The edge detecting unit 1202 performs a process for detecting an edge. In this example, three contiguous lines are selected as lines of interest and the fact is used that if an edge of an image is on the center line of the lines of interest, the value of a pixel of interest is always non-zero and the value of one of the pixels below and above the pixel of interest is 0. That is, the pixel at the center of the three contiguous pixels at a given position on the three contiguous lines is selected as the pixel of interest and determination is made as to whether one of the pixels above and below the pixel of interest is 0. The determination is repeated while moving the area of interest. If a predetermined number of contiguous areas in which one of the pixels above or below the pixel of interest is 0 are found, the areas are considered as an edge and an error diffusion edge determination flags for the area are turned ON. The error diffusion edge determination flags are associated with and stored with the pixels of interest. Of course, the direction of the edge in the contiguous areas must be the same. After all the pixels are searched through, the process proceeds to a decoder 1203.

The decoder 1203 outputs "Interpolation ON" as the result of determination for areas for which the error diffusion edge determination flags are turned ON. After the determination for all pixels is completed, the result of interpolation determination 10D is output.

With this configuration, smoothness of an edge of image data that underwent the error diffusion process can be ensured. If the configuration shown in FIG. 12 is used in addition to the configuration shown in FIG. 11 or instead of the continuous tone image determining unit 1101, the decoder refers to the table as shown in FIG. 14 to determine interpolation determination flags.

Once a bitmap of the interpolation determination flags is generated, step S1004 of FIG. 10 and the subsequent steps are performed with reference to the bitmap to apply the interpolation process to the areas with a predetermined length before and after a scan line changing point, except for the interpolation inhibited areas.

According to the exemplary embodiment configured as described above, areas where interpolation can degrade the quality of the image can be excluded from the interpolation process. Furthermore, even if attribute information indicating the type of an image is not associated with the image data, the type, namely the attribute, of the image can be determined from the image data alone and determination can made on the basis of the attribute as to whether the interpolation process should be performed or not. Furthermore, even the attribute of halftoned image data can be determined. Therefore, it can be properly determined before the interpolation process is performed whether the interpolation process should be applied to image data that was halftoned at the sender of the image data.

[Variations]

While the continuous tone image determining unit 1101, pattern image determining unit 1102, and isolated point image determining unit 1103 are used as the circuits for determining whether the interpolation process of an image should be performed or not, the combination of attributes to be determined is not limited to this. Any attributes may be determined in a system that includes a number of attribute determining modules. A system that includes more than three determining units may be used, of course.

While pattern matching is used as a method for determining attributes by way of example in the exemplary embodiment, other method may be used for determining attributes.

While the either-or decision between "Interpolation determination ON" and "Interpolation determination OFF" has been described in the interpolation method in the exemplary embodiment, the level of interpolation can be changed depending on attributes. That is, in addition to the determination as to whether to perform the interpolation process or not, the range in which interpolation is applied may be varied stepwise. For example, the range in which interpolation is performed can be changed by changing the number of pixels around a scan line changing point to which interpolation is to be applied. For example, if a default value is 16 pixels around a scan line switching point, a value greater than the default value can be set to increase an interpolation range (to 24 pixels around the point, for example). Also, the range can be reduced (to 8 pixels, for example, around a scan line changing point).

Furthermore, the range can be identified by the position and line number of a scan line changing point. In other words, an interpolation inhibited area can be identified by a scan line changing point and line. Therefore, attribute determination flags may be stored only for areas (runs) that include a scan line changing point. An attribute determination flag is a generic term to refer to the continuous tone image determination flag, continuous pattern determination flag, isolated point determination flag, and error diffusion edge determination flag. The attribute determination flags of only such areas may be stored because the interpolation process is performed on a predetermined number of pixels around a scan line changing point.

In this case, rather than determining the values of interpolation determination flags of all pixels of the entire image, the determination may be made only for those areas that include a scan line changing point, for example the pixel immediately before a scan changing point. Then the interpolation determination flags of the areas that include the scan line changing points are determined with reference to a table as shown in FIG. 14 and are associated and stored with the scan line changing points and lines.

[Second Exemplary Embodiment]

Figure 18:
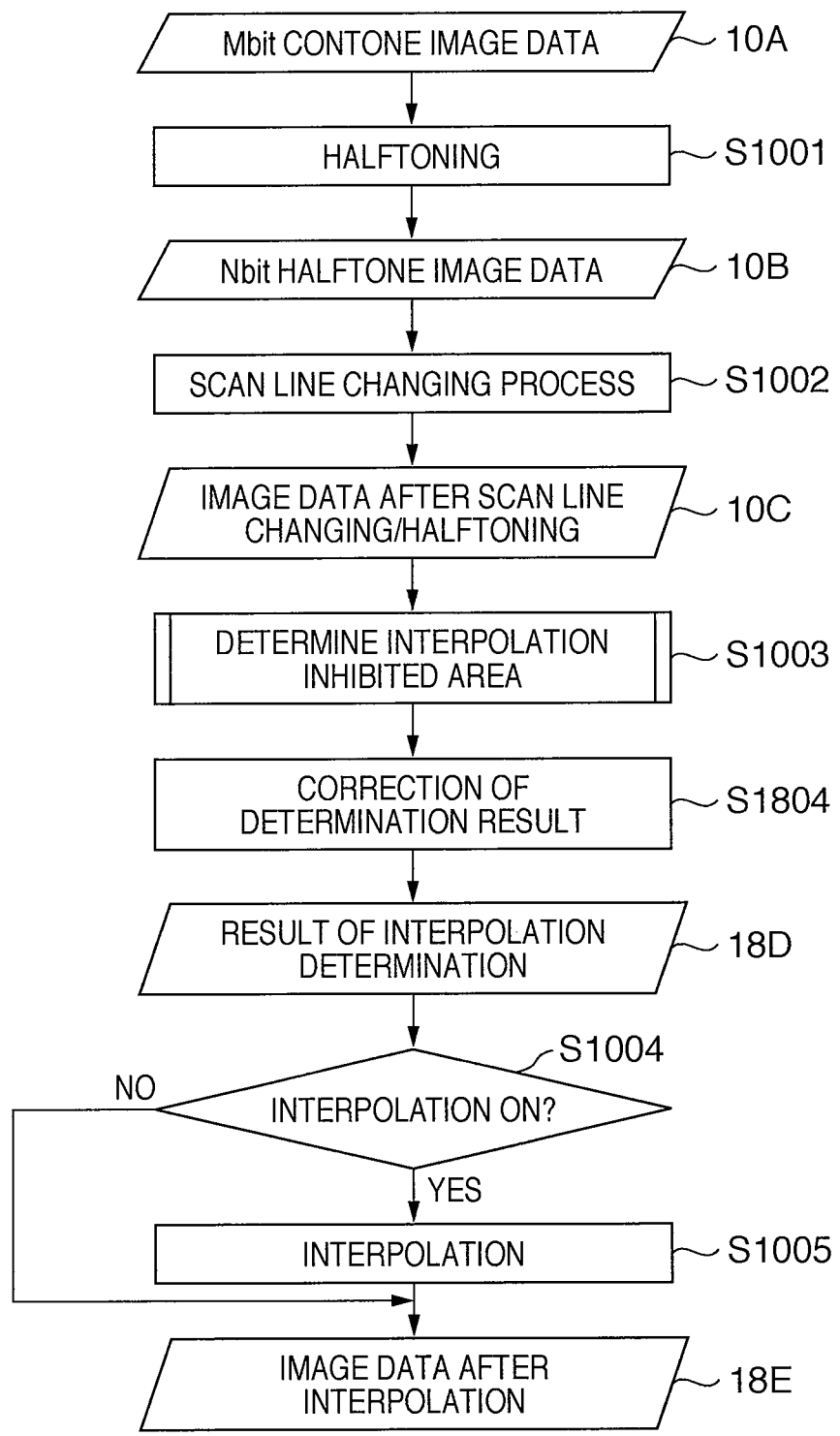
FIG. 18 is a flowchart showing a second exemplary embodiment.

Another exemplary embodiment will be described in which a process for correcting the result of determination is performed before the interpolation process at S1005 of FIG. 10. The process is performed for correcting an erroneous determination of an interpolation inhibited area determination at S1103 or for ensuring the continuity of the results of determination. FIG. 18 shows a flow of the interpolation process in the present exemplary embodiment. The same steps as those of FIG. 10 are labeled with the same reference numerals.

At step S1001, halftoning of M-bit contone image data 10A is performed at a halftoning unit 407C, 407M, 407Y, 407K. Here, the halftoning is performed by using a screening process or error diffusion process. Then the process proceeds to step S1002.

At step S1002, a scan line changing process is performed at the timing at which image data is read from a storage unit 408.

At step S1003, interpolation inhibited areas are determined at an interpolation determining unit 409C, 409M, 409Y, 409K. If a screening process has been performed in the halftoning at S1001, the process described with reference to FIG. 11 is performed; if an error diffusion process has been performed in the halftoning at S1001, the process described with reference to FIG. 12 is performed. Then the process proceeds to step S1804.

At step S1804, a process for correcting the result of interpolation determination 10D generated at the interpolation determining unit 409C, 409M 409Y, 409K is performed. For example, if the interpolation inhibited area determination at S1003 is performed line by line, the data needs to be checked to see whether the continuity with the lines above and below a line of interest is maintained. Furthermore, if an erroneous interpolation determination is made in the main scanning direction, the result of determination needs to be corrected on the basis of the correlation with neighboring pixels.

In order to reduce variations in the results of interpolation determination, a determination result correcting process is performed at S1804 in which the value of a pixel of interest is ANDed or ORed with the values of the pixels above and below or to the right and left of the pixel of interest and the result is set as the interpolation determination flag of the pixel of interest or other predetermined processing is applied to reduce the variations. The determination result correcting process is a process for making local interpolation determination results for pixels around a pixel of interest uniform. If the process is performed in overlapping areas, the entire image may be homogenized. Therefore, a preceding pixel a predetermined number of pixels apart from a scan line changing point is selected as the first pixel of interest to avoid the influence of distant pixels on the pixels in the area in which the scan line changing is made while ensuring a uniform value of the interpolation determination flags.

Then, at step S1004, the following process is performed with reference to the result of interpolation determination 10D. If the result of determination for a pixel of interest is "Interpolation determination flag ON", the process proceeds to step S1005, where the interpolation process is performed at an interpolation unit 412, then the process proceeds to the next pixel of interest. On the other hand, if the result of determination is "interpolation determination flag OFF", the process proceeds to the next pixel of interest without performing the interpolation process. After the interpolation process of all pixels is completed, image data 18E that underwent the interpolation process is output and then the process will end.

By performing the process for correcting the result of interpolation determination in this way, continuity in the results of interpolation determination can be retained.

The present invention may be applied to a system including multiple devices (for example a system including a host computer, an interface device, a reader, and a printer) or to an apparatus formed by a single device (for example a copying machine or a facsimile machine). The object of the present invention can also be achieved by providing a recording medium on which a program code that implements the functions of any of the exemplary embodiments described above is recorded to a system or apparatus to cause the system or apparatus to read and execute the program code stored on the recording medium. In that case, the program code itself read from the recording medium implements the functions of any of the exemplary embodiments described above and the program code itself and the recording medium on which the program code is recorded constitute the present invention.

The present invention also includes an implementation in which an operating system (OS) running on a computer performs part or all of actual processing in accordance with instructions in the program code and the processing implements the functions of any of the exemplary embodiments described above. The present invention is also applicable to an implementation in which the program code read from a recording medium is written on a memory provided in a function expansion card inserted in a computer or a function expansion unit connected to a computer. In that case, a CPU and other components provided in the function expansion card or the function expansion unit perform part or all of actual processing in accordance with instructions in the program code written and the processing implements the functions of any of the exemplary embodiments described above.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-220351, filed Aug. 27, 2007, which is hereby incorporated by reference herein in its entirety.

What is claimed is:

1. An image forming apparatus having an image carrier on which an image is formed by a beam scanning comprising:
   a halftoning unit configured to apply a halftoning process to image data to generate halftoned image data;
   a shifting unit configured to shift positions of plural pixels included in the halftoned image data in a sub scanning direction to generate shifted halftoned image data, so that a shift in the sub scanning direction of an image formed on the image carrier by a beam scanning is canceled;
   a determining unit configured to determine whether an area in the shifted halftoned image data has a predetermined pattern, by a pattern matching between a pattern of plural pixels included in the area in the shifted halftoned image data and the predetermined pattern; and
   an interpolation unit configured to apply an interpolation process for smoothing a pixel-level shift caused by the shifting of the halftoned image data by the shifting unit to the shifted halftoned image data, wherein the interpolation unit does not apply the interpolation process to an area in the shifted halftoned image data determined to be the area having the predetermined pattern in the shifted halftoned image data by the determining unit.

2. The image forming apparatus according to claim 1, wherein the determining unit comprises:
   a dither pattern detecting unit configured to detect a periodicity of a dither pattern in the shifted halftoned image data if the shifted halftoned image data is dithered image data;
   an isolated point detecting unit configured to detect an isolated point in the shifted halftoned image data; and
   a continuous pattern detecting unit configured to detect a continuous pattern in the shifted halftoned image data;
   wherein the area having the predetermined pattern in the shifted halftoned image data is determined from the results of detection by the dither pattern detecting unit, the isolated point detecting unit, and the continuous pattern detecting unit.

3. The image forming apparatus according to claim 1, further comprising a correcting unit configured to correct a result of the determination of an area in the shifted halftoned image data including a point where a shift amount of a position of a pixel included in the halftoned image data by the shifting unit before the point is different from a shift amount of a position of a pixel included in the halftoned image data by the shifting unit after the point, on the basis of a result of a determination by the determining unit of an area adjacent to the area including the point.

4. The image forming apparatus according to claim 2, wherein:
   the determining unit further comprises an edge detecting unit configured to detect an edge of an image;
   if the image data is dithered image data, the dither pattern detecting unit detects a dither pattern in the shifted halftoned image data; and
   if the image data is error-diffused image data, the edge detecting unit detects an edge in the shifted halftoned image data.

5. The image forming apparatus according to claim 1, wherein the interpolation unit stepwise change the level of interpolation.

6. An image forming method in an image forming apparatus having an image carrier on which an image is formed by a beam scanning the method comprising:
   applying a halftoning process to image data to generate halftoned image data;
   shifting of plural pixels included in the halftoned image data in a sub scanning direction to generate shifted halftoned image data, so that a shift in the sub scanning direction of an image formed on the image carrier by abeam scanning is cancelled;
   determining whether an area in the shifted halftoned image data has a predetermined pattern, by a pattern matching between a pattern of plural pixels included in the area in the shifted halftoned image data and the predetermined pattern; and
   applying an interpolation process for smoothing a pixel-level shift caused by the shifting of the halftoned image data by the shifting to the shifted halftoned image data, wherein the interpolation process is not applied to an area in the shifted halftoned image data determined to be the area having the predetermined pattern in the shifted halftoned image data by the determining.

7. A non-transitory computer readable media which stores a program for causing computer to perform an image correcting method for an image forming apparatus having an image carrier on which an image is formed by a beam scanning, the method comprising:
   applying a halftoning process to image data to generate halftoned image data;
   shifting positions of plural pixels included in the halftoned image data in a sub scanning direction to generate shifted halftoned image data, so that a shift in the sub scanning direction of an image formed on the image carrier by a beam scanning is canceled;
   determining whether an area in the shifted halftoned image data has a predetermined pattern, by a pattern matching between a pattern of plural pixels included in the area in the shifted halftoned image data and the predetermined pattern; and
   wherein an interpolation process for smoothing a pixel-level shift caused by the shifting of the halftoned image data by the shifting is applied to the shifted halftoned image data;
   wherein the interpolation process is not applied to an area in the shifted halftoned image data determined to be the area having the predetermined pattern in the shifted halftoned image data by the determining.

8. The image forming apparatus according to claim 1, wherein the predetermined pattern is a pattern where an image quality of the area having the pattern deteriorates in a case that the interpolation process is applied to the area having the pattern in the shifted halftoned image data.

9. The image forming apparatus according to claim 1,
   wherein the halftoning unit applies a screening process using a dither matrix as the halftoning process; and
   wherein the determining unit performs the pattern matching by checking a pattern of run-length of the plural pixels included in the shifted halftoned image and the predetermined pattern determined on the basis of a pattern of the dither matrix.

10. The image forming apparatus according to claim 9, further comprising a correcting unit configured to correct a result of a determination by the determining unit of a first area in the shifted halftoned image data, in a case where results of determinations by the determining unit of a second and a third areas in the shifted halftoned image data adjacent to the first area are the same and the result of the determination of the first area and the result of the determination of the second area are different.

11. The image forming apparatus according to claim 9, further comprising a correcting unit configured to correct a result of the determination of an area in the shifted halftoned image data including a point where a shift amount of a position of a pixel included in the halftoned image data by the shifting unit before the point is different from a shift amount of a position of a pixel included in the halftoned image data by the shifting unit after the point, in a case where results of determinations by the determining unit of areas in the shifted halftoned image data adjacent to the area in the shifted halftoned image data including the point are the same and the result of the determination of the area including the point and the result of the determination of one of the areas adjacent to the area including the point are different.

12. The image forming apparatus according to claim 1,
    wherein the halftoning unit applies a screening process using a dither matrix as the halftoning process;
    wherein the determining unit comprises:
        a dither pattern detecting unit configured
            to binarize the shifted halftoned image data to generate first binarized image data by binarizing a pixel of interest in the shifted halftoned image data using a threshold for the pixel of interest, the threshold being an average of surrounding pixels of the pixel of interest, and
            to detect a periodicity of a pattern of the dither matrix in the generated first binarized image data by checking the pattern of the plural pixels included in the generated first binarized image and a first pattern determined on the basis of a pattern of the dither matrix;
        an isolated point detecting unit configured
            to binarize the shifted halftoned image data to generate second binarized image data by binarizing a pixel of interest in the shifted halftoned image data using a predetermined threshold, and
            to detect an isolated point in the generated second binarized image data by checking the pattern of the plural pixels included in the generated second binarized image and a second pattern of an isolated point; and
        a unit configured to determine whether an area in the shifted halftoned image data has the predetermined pattern, on the basis of results of the detection by the dither pattern detecting unit and the isolated point detecting unit.

* * * * *